SYNCHRONIZATION TIMING DIAGRAM
FOR IN SYNC CONDITION

INVENTOR.
WALTON GRAHAM

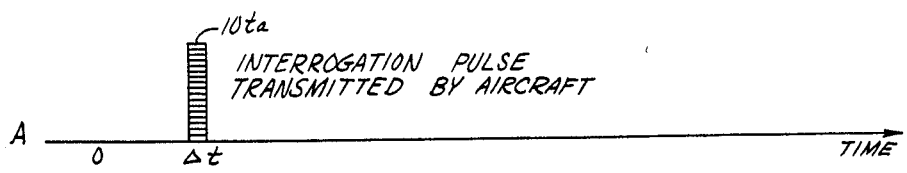
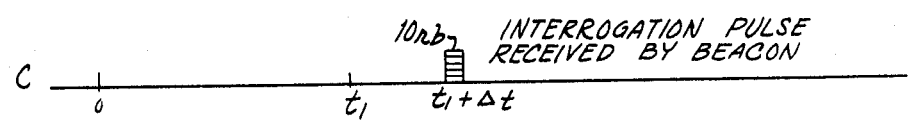
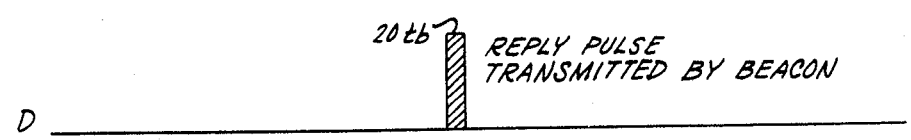
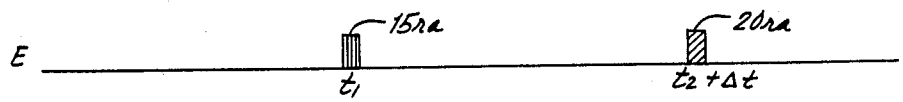
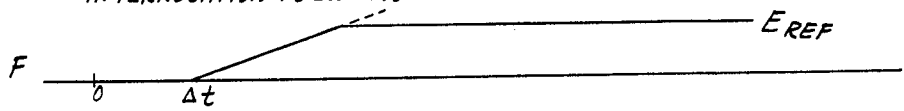
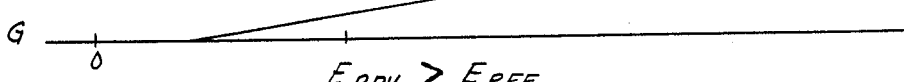
Fig. 2.
SYNCHRONIZATION TIMING DIAGRAM FOR OUT OF SYNC CONDITION (INTERROGATION PULSE LATER BY $\Delta t$)

SYNCHRONIZATION TIMING DIAGRAM
FOR OUT OF SYNC CONDITION
(INTERROGATION PULSE EARLY B $\Delta t$)

INVENTOR.
WALTON GRAHAM
BY Darby & Darby
ATTORNEYS

TRANSMISSION OF ALTITUDE DATA WITHOUT
TRANSMISSION OF EXTRA PULSES BY AIRCRAFT

MODIFIED SYNCHRONIZATION TIMING FOR IN-SYNC CONDITION

June 14, 1966  W. GRAHAM  3,255,900
COMPATIBLE AIRBORNE NAVIGATION-AIR TRAFFIC CONTROL
AND COLLISION AVOIDANCE SYSTEM
Filed July 14, 1960  13 Sheets-Sheet 8
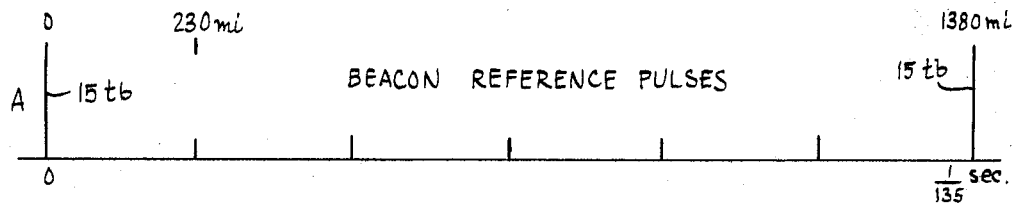
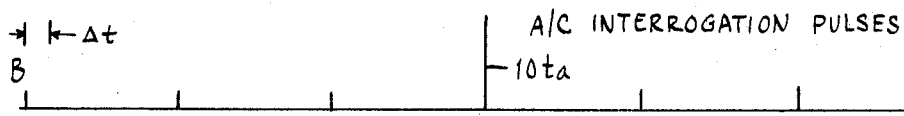
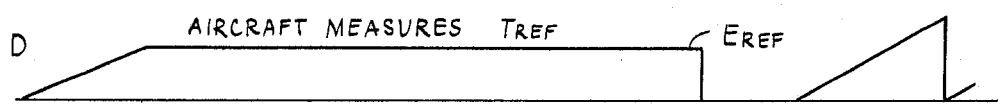
Fig. 8.
MODIFIED SYNCHRONIZATION TIMING
FOR OUT-OF-SYNC CONDITION
(INTERROGATION PULSE EARLY BY $\Delta t$)
INVENTOR.
WALTON GRAHAM
BY Darby & Darby
ATTORNEYS MODIFIED SYNCHRONIZATION TIMING FOR OUT-OF-SYNC CONDITION (INTERROGATION PULSE LATE BY Δt)

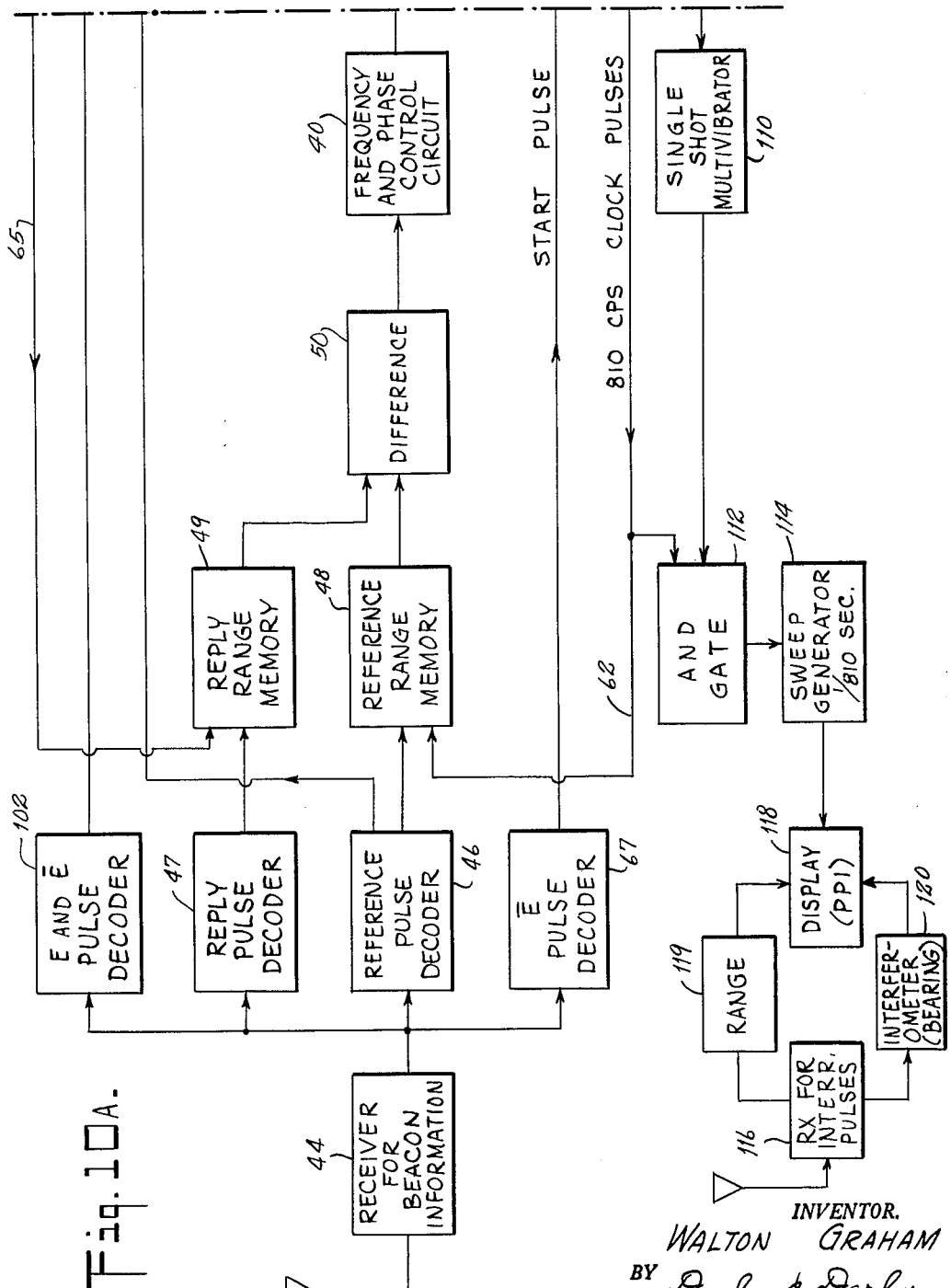

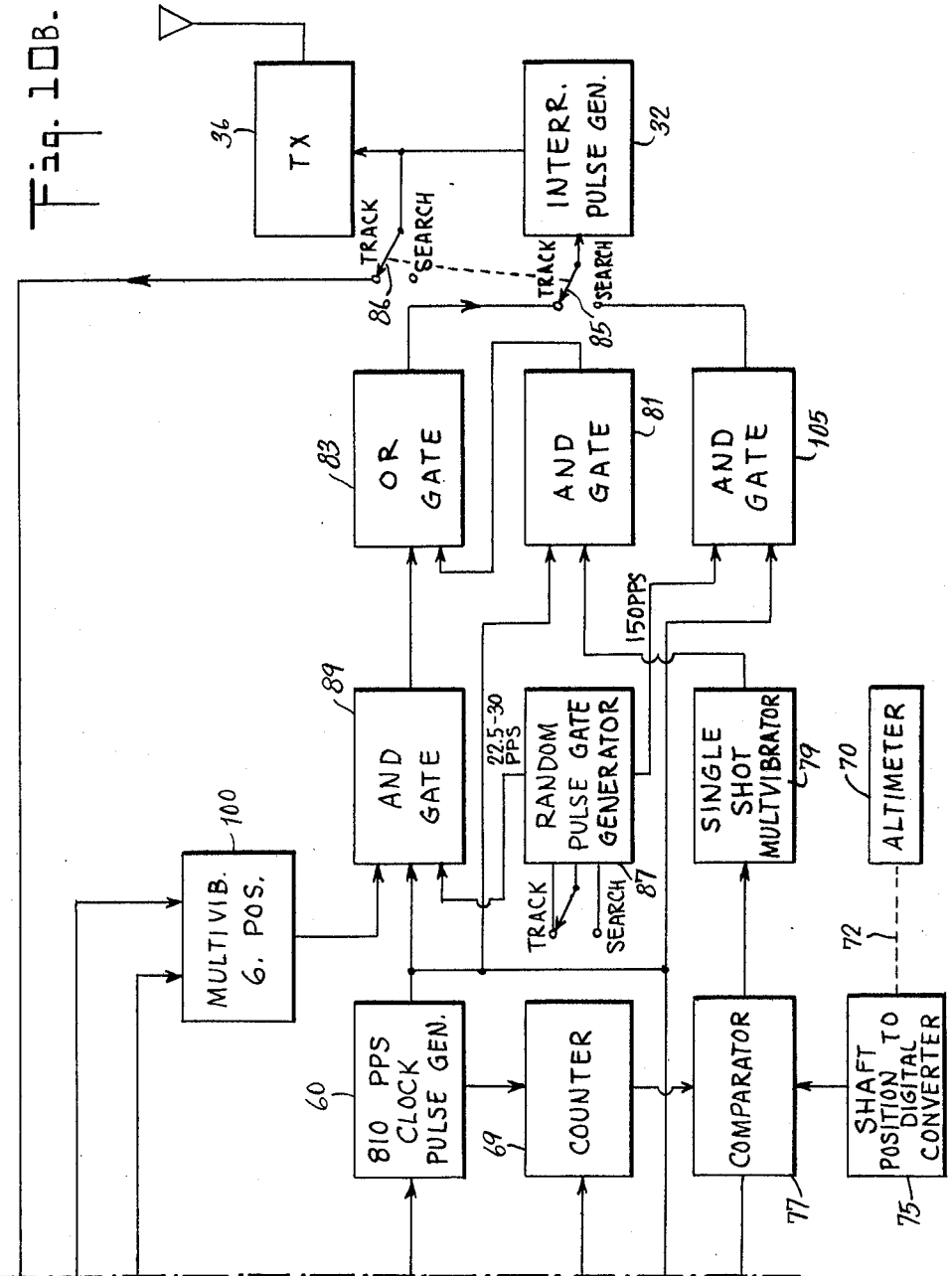

RANDOM PULSE GENERATOR

INVENTOR.
WALTON GRAHAM
BY Darby & Darby
ATTORNEYS

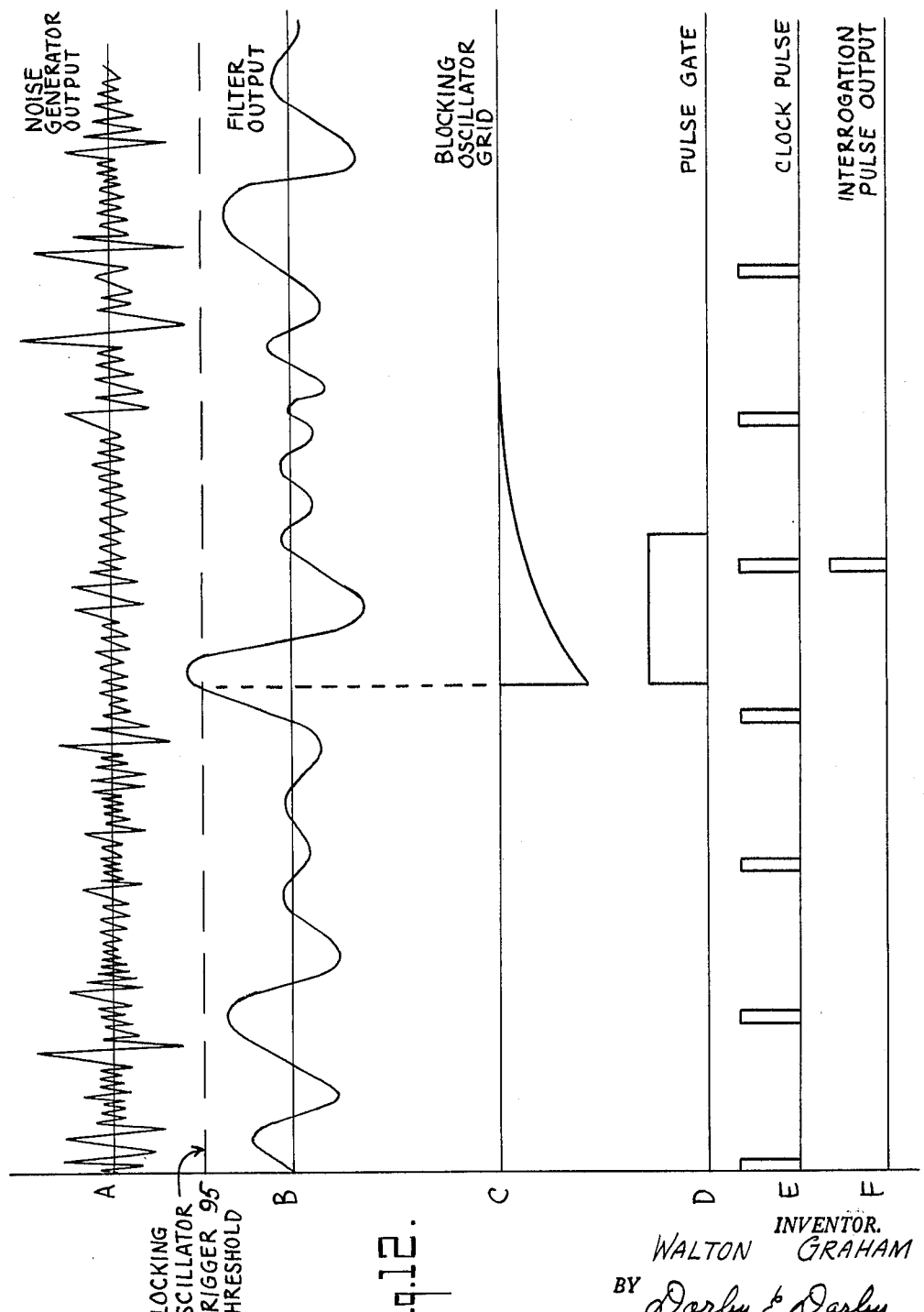

United States Patent Office 3,255,900
Patented June 14, 1966

3,255,900
COMPATIBLE AIRBORNE NAVIGATION - AIR TRAFFIC CONTROL AND COLLISION AVOIDANCE SYSTEM
Walton Graham, Roslyn, N.Y., assignor, by mesne assignments, to Control Data Corporation, South Minneapolis, Minn., a corporation of Minnesota
Filed July 14, 1960, Ser. No. 42,836
34 Claims. (Cl. 343—7.5)

This invention relates to aircraft radio navigation systems and more particularly to a method and system for supplementing existing radio navigation systems so that they are capable of being used for pilot warning, collision avoidance, and air traffic control purposes, in addition to the basic navigation function.

As the number of aircraft operating in the air space increases, it becomes more and more necessary to provide a system to prevent aircraft collisions. The collision problem also becomes greater as the speeds of aircraft increase since it takes longer for an aircraft to institute and complete an evasive maneuver to avoid a collision once visual or radio contact with a possible colliding craft is made. In many cases, where visual contact alone is relied upon, the speeds of the aircraft are so great that there is not enough time to make an evasive maneuver to avoid collision.

In certain types of aircraft radio navigation systems, the aircraft carries a navigation transmitter and receiver. By cooperative signalling with a ground base station, the bearing of the aircraft and the range of the aircraft from the ground station can be determined. One such radio navigation system currently in use is the TACAN system. In the TACAN system, each aircraft determines its range from a ground station (beacon) by measuring the elapsed time between the transmission of an interrogating pulse and the reception of a reply pulse, which is transmitted by the beacon in response to the aircraft's interrogation pulse. Bearing is determined by the phase measurement of a low frequency signal produced by a rotating radiation pattern transmitted by the beacon as compared with a reference signal. The principles of the TACAN system are described in an article entitled "Principles of Tacan" appearing in the March 1956 edition of "Electrical Communication." This navigation system is also described elsewhere and it is therefore not necessary to further describe its operating principles. The present invention is particularly applicable to, but not limited to, the TACAN system.

As pointed out in the aforementioned article, the interrogation pulses transmitted by different aircraft are not synchronized, and the reception by one aircraft of pulses transmitted by other aircraft cannot be exploited directly to yield the range between aircraft. In fact, reception of other aircraft's interrogation pulses is usually avoided in order not to create any interference or confusion between each aircraft's transmission and reception of its own pulses.

According to one aspect of the present invention, by synchronizing all aircraft radio navigation transmitters with the beacon transmitter and by receiving pulses from other aircraft, each aircraft can measure the range to all of the other aircraft from which it receives pulses. This can be done merely by measuring the elapsed time between the transmission of the measuring aircraft's transmitted interrogation pulse and the reception of the interrogation pulse from another aircraft. Since, due to synchronization, both pulses are transmitted at the same time, the measurement of the elapsed time gives the range. Such range measurement between aircraft is particularly advantageous since it enables pilot to ascertain whether there is another aircraft close enough to collide with him and gives him sufficient time to evade it. By eliminating reception of pulses corresponding to ranges beyond the possible collision zone and by using altitude codes along with the transmitted pulses to tell the altitude of the aircraft, the number of other aircraft detected by any one aircraft can be limited to those of possible collision importance. Therefore, the pilot of the aircraft in question would be concerned only with those aircraft which are of possible danger.

The bearing of one aircraft with respect to another can also be determined by making measurements of the received pulses, for example, by the use of such well known techniques as interferometric radio measurements. By providing each aircraft with the range, altitude and bearing of all other aircraft within the apparent danger sector a pilot waring indicator and collision avoidance system can be realized.

By using similar techniques at the beacon station, or any other ground station synchronized with the beacon, an air traffic control system can be realized to the extent of providing the ground station with the range, bearing, and altitude of every aircraft within the line of sight of the ground station which is also synchronized to the beacon.

One way of maintaining the required transmitter synchronization is to provide every aircraft and every beacon with highly accurate frequency standards such as an atomic frequency standard. Such a system was proposed in a paper entitled "Atomichrons in Collision Avoidance and Air Traffic Control Systems" which was presented to the Air Transportaton Association meeting in August 1958, at Washington, D.C. However, even the best atomic frequency standard usable in such a system, once synchronized, could maintain the required timing accuracy for periods of only about one day, after which they would have to be re-synchronized. Atomic frequency standards also have several other inherent disadvantages since they would greatly add to the weight of the equipment to be carried by the aircraft. These instruments are also very complex and very expensive.

The present invention accomplishes the aforesaid objectives of providing range, bearing and altitude information without the use of a separate frequency standard on each aircraft and at each beacon. In the present invention, all of the airborne transmitters within the range of a ground station are synchronized with the ground station transmitter by electronic devices carried in the aircraft utilizing substantially only those transmissions which are already present in existing pulse-beacon navigation systems. Additionally, all of the ground stations may be themselves synchronized to one another and, therefore, all of the aircraft transmitters will be synchronized with each other. The same pulse transmissions, which already exist, are also used by the aircraft to provide altitude and other information.

It is therefore an object of this invention to provide an aircraft range-indicating collision avoidance system.

Another object of this invention is to provide a collision avoidance system for aircraft which is compatible with presently existing aircraft radio navigational systems.

Yet another object of the invention is to provide a pilot warning system for aircraft which alerts the pilot of an aircraft to the possible danger of an impending collision, the system being compatible with presently existing aircraft radio navigation aids.

Still a further object of this invention is to provide a collision avoidance system for aircraft in which the aircraft radio navigation transmitters are synchronized with a common ground transmitter.

Yet a further object of this invention is to provide an air traffic control system in which the navigation transmitters in an aircraft are synchronized with a common ground station so that the ground station can ascertain the range, bearing and altitude of every aircraft within the range of the ground station.

Still a further object of the invention is to provide a system wherein a plurality of aircraft can determine the range, bearing and altitude with respect to other aircraft in the vicinity.

Another object of this invention is to provide a system of transmitting aircraft altitude and other information by using the transmissions already present in the navigation system.

Other objects and advantages of the present invention will become more apparent upon reference to the following specification and annexed drawings, in which:

FIGURES 2A–2G show the time relationship of various pulses when the aircraft transmitter is not synchronized with the beacon transmitter, due to the aircraft interrogation pulses lagging the beacon reference pulse by a time $\Delta t$;

FIGURES 8A–8H show timing relationships for the system of FIGURE 7 in which the interrogation pulse leads the ground station reference pulse by a time $\Delta t$;

Figure 11:
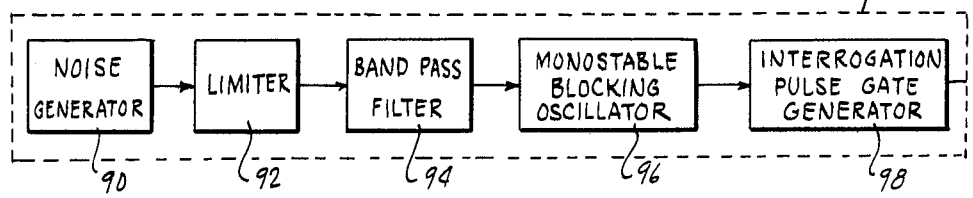
Figure 13:
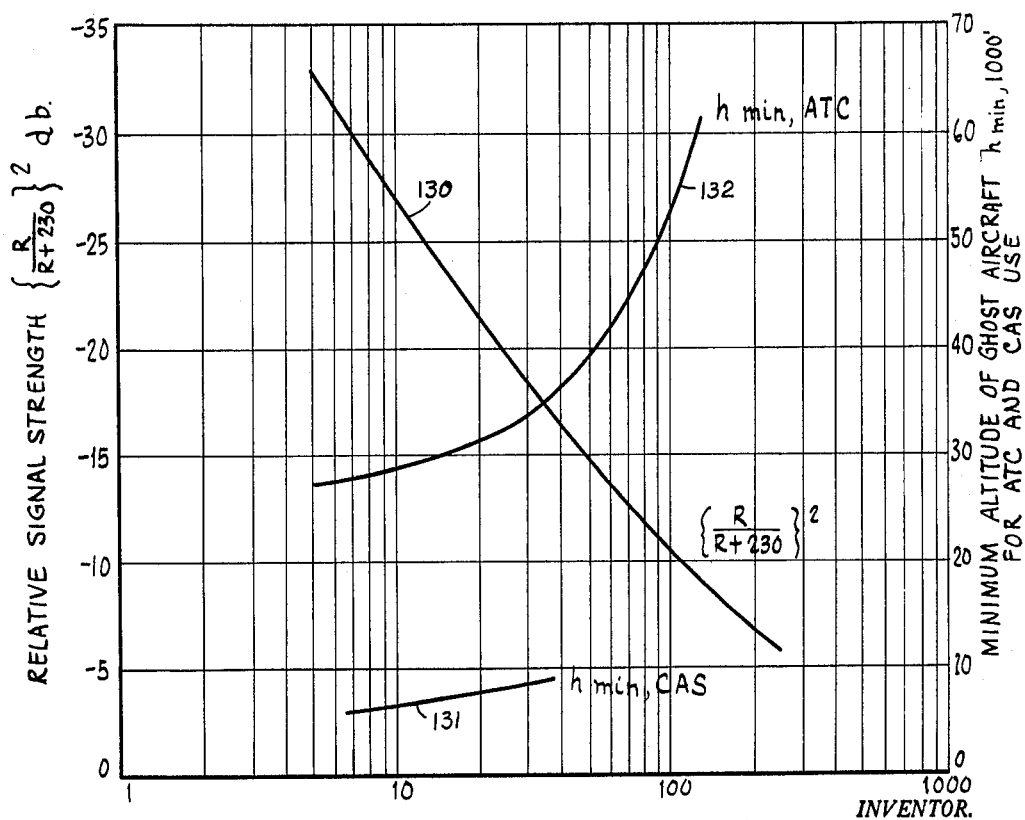

FIGURES 10A–10B taken together is a schematic block diagram of one form of the system;

FIGURE 11 is a schematic block diagram of a type of random pulse generator used with the system of FIGURES 10A–10B;

FIGURE 12 shows the waveforms at various points of the pulse generator of FIGURE 11 and at other points in the system; and FIGURE 13 is a chart showing relative signal strength and ghost conditions for different ranges between several stations.

Figure 1:
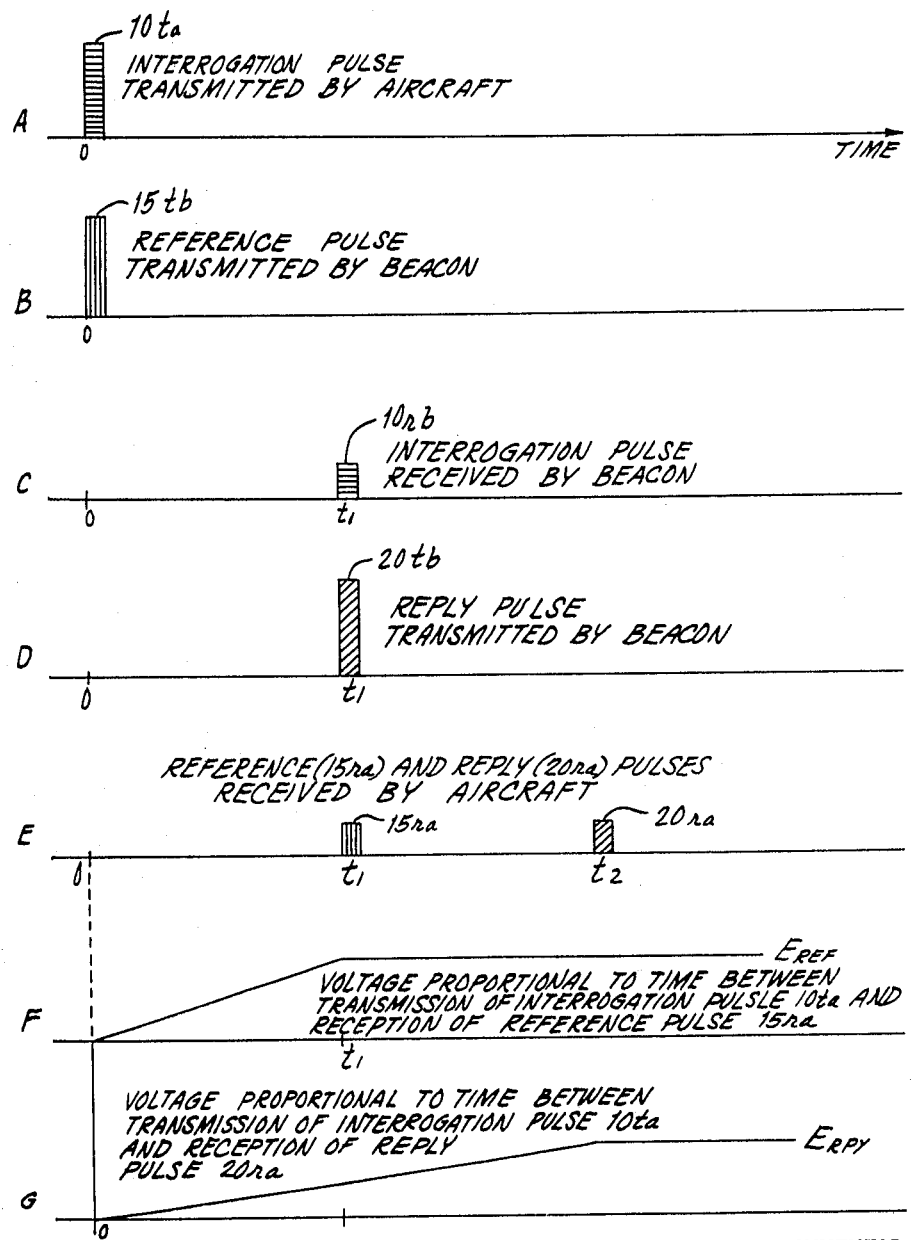
FIGURES 1A–1G show the time relationship of various pulses when the aircraft transmitter is in synchronism with the ground station.
FIGURE 1H illustrates the operation of the system with a beacon station and a number of mobile stations.
Figure 1H:
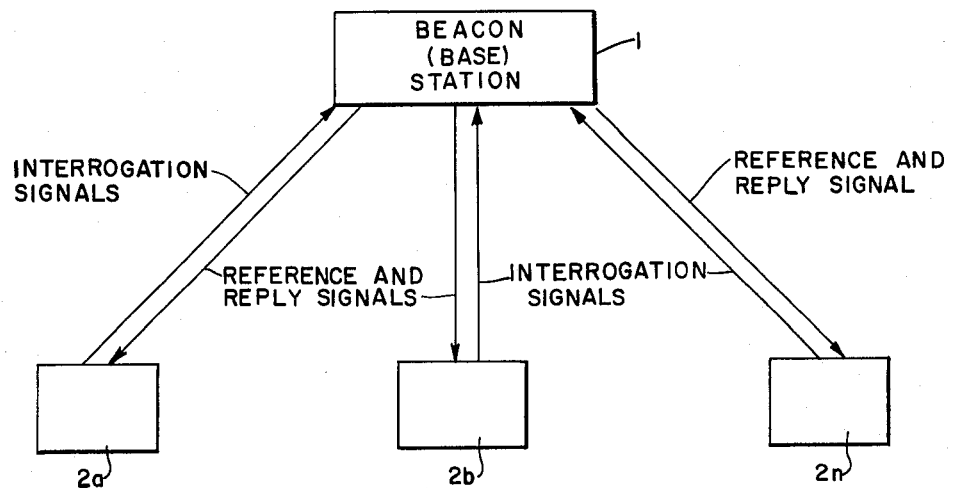

FIGURE 1H illustrates the basic principles of the system of the present invention. Here, a beacon (or base) station 1 is provided. Beacon station 1 periodically transmits beacon reference pulses at fixed times which are received by one or more stations designated 2, 2a, . . . 2n. These stations may be, for example, aircraft which move with respect to the beacon and each other. Each station 2 transmits interrogation signals at various times and these are received by both the beacon station and the other stations designated 2. In response to each received interrogation signal from a station 2, the beacon transmits a reply signal. In accordance with the invention, an arrangement is provided to bring all of the interrogation signals transmitted by the stations designated 2 into a synchronous condition whereby each station 2 can measure its range to the beacon 1 and to each other. Also, the synchronous condition is such, so that each station 2 can transmit its interrogation signal at a predetermined time corresponding to an assigned informational datum, and enabling all other stations to derive this datum.

Referring to FIGURE 1, the basic transmission signals which make up an aircraft radio navigation system are shown. While the present invention is to be described as used with a TACAN system, it should be realized that it is not limited thereto but that it has applications with respect to other types of radio navigation systems including those using distance measuring equipment. The navigation system transmissions include an interrogation pulse which is transmitted (at a station 2) by an aircraft transmitter and is designated by the reference number 10ta to signify transmitted from the aircraft. For clarity, this pulse is shown with a plurality of horizontal lines which have no electrical significance but merely identify the interrogation pulse for convenience in analyzing the operation of the system.

The second basic transmission pulse is the reference pulse which is transmitted by the ground, or beacon, station 1. This pulse is designated as 15tb. The reference pulse transmitted by the beacon is shown in FIG. 1B with a plurality of vertical lines in order to aid in understanding the operation of the invention.

The third signal transmission is the beacon reply pulses, designated 20tb and shown with a plurality of slanted lines in FIGURE 1D. The reply pulse 20tb is transmitted by the beacon in response to an interrogation pulse. The interrogation pulse 10rb received by the beacon is shown in FIGURE 1C. Received pulse 10rb is of lesser amplitude than transmitted pulse 10ta since it is attenuated in space.

While navigation systems such as TACAN normally transmit pairs of pulses with prearranged spacing to increase the average power radiated and to make the system less susceptible to errors or interference caused by false signals, these pulse pairs are omitted for the purpose of clarity. It should be realized that the system of the present invention can operate on both single pulse and group pulse transmission.

For the purpose of explaining the principles of operation of the invention, consider that the interrogation pulse 10ta and the beacon reference pulse 15tb are initially synchronized, as shown on lines A and B of FIGURE 1. These pulses occur simultaneously at time $t=0$. At time $t=t_1$, the beacon reference pulse 15ra is received by the aircraft (FIGURE 1E) and the aircraft interrogation pulse 10rb is received by the beacon (FIGURE 1C). Both of these received pulses are attenuated in space. The time $t_1$ is equal to the slant range between the aircraft and the beacon divided by the velocity of propagation of the medium through which the signal is transmitted.

After the beacon receives the interrogation pulse 10rb (FIGURE 1C) it transmits a reply pulse 20tb in response to it (FIGURE 1D). In this discussion, it is assumed that the reply pulse is initiated simultaneously with the reception of the interrogation pulse; actually there is some time delay, but this is compensated in the system so as to have no effect and hence it can be ignored. Reply pulse 20ra is picked up by the aircraft radio navigation receiver (FIGURE 1E) at time $t_2$. The time $t_2-t_1$ is equal to the distance between the beacon and the aircraft divided by the velocity of propagation of the medium through which the beacon reply pulse is transmitted.

Circuits are provided in the aircraft to measure the time between the transmission of its interrogation pulse 10ta and the reception of the reference pulse 15ra and the time between transmission of the aircraft interrogation pulse 10ta and the reception of the beacon reply pulse 20ra. These two times are respectively designated $T_{REF}$ and $T_{RPY}$. The aircraft time measuring circuits may be any of a number of suitable types of circuits including an analog circuit such as, for example, a capacitor on which a voltage is stored which is representative of time. The voltages so produced representative of the respective times are designated $E_{REF}$ and $E_{RPY}$. In the latter type of circuit a capacitor starts charging toward a fixed potential on the transmission of the interrogation pulse and the charging is terminated by the receipt of the reference or reply pulse. The charge on the capacitor is therefore proportional to the time between the transmission of the interrogation pulse and the reception of the reference or reply pulse.

When the interrogation pulse 10ta and the beacon reference pulse 15tb are initially synchronized, as is the presently assumed case, $T_{RPY}$ equals $2T_{REF}$. This is apparent when it is considered that $T_{REF}$ is the time between transmission of the beacon reference pulse, at $t=0$, and the reception of the reference pulse by the aircraft at $t=t_1$. This time $t_1-0$ ($T_{REF}$) seconds is equal to the slant range between the aircraft and the beacon divided by the velocity of propagation of the medium through which the reference pulse is transmitted. Since the reference pulse and the interrogation pulse are initially synchronized, it will take the same length of time for the interrogation pulse, transmitted at $t=0$, to travel from the aircraft to the beacon as it took for the reference pulse to travel from the beacon to the aircraft. Upon receipt of the interrogation pulse at time $t_1$ seconds, the beacon transmits the reply pulse (at time $t_1$ seconds). The reply pulse is received at the aircraft at time $t_2$ seconds and the time for the reply pulse to travel from the beacon to the aircraft is the same as the time which it took the reference pulse to travel from the beacon to the aircraft or the interrogation pulse from the aircraft to the beacon; i.e. $t_1-0=t_2-t_1$. Therefore, since the interrogation pulse was initially synchronized with the beacon reference pulse, the time $T_{RPY}$ between the interrogation pulse (0 seconds) and the receipt of the reply pulse (time equals $t_2$ seconds) is equal to twice the time $T_{REF}$ between the transmission of the beacon reference pulse and its reception by the aircraft. Therefore, for the synchronized case, $T_{REF}$ is equal to $t_1$ seconds, $T_{RPY}$ is equal to $t_2$ seconds and $T_{RPY}=2T_{REF}$.

If the circuit which produces the voltage representative of $T_{RPY}$ operates at half the rate of the circuit on which the $T_{REF}$ voltage is produced, at the instant of reception of the reply pulse 20ra the voltage stored on the two capacitors should be identical: i.e., $E_{REF}$ equals $E_{RPY}$. This is true because due to the initial synchronization of the pulses $t_1-t_0=t_2-t_1$ and $t_2-t_0=2(t_1-t_0)$, or $T_{RPY}=2T_{REF}$, since $T_{REF}=t_1$ and $T_{RPY}=t_2$ in this example.

When the interrogation pulse 10ta and the reference pulse 15tb are not synchronized, a voltage difference appears on the two capacitors after the reception of reply pulse 20ra. This voltage difference is used in the present invention to bring the transmission of the interrogation pulse 10ta into synchronization with the transmission of the beacon reference pulse 15tb by a suitable arrangement, such as a servo-mechanism system.

FIGURE 1F shows the voltage analog which is proportional to the time between transmission of interrogation pulse 10ta and the reception of the beacon reference pulse 15ra. The linear rise of the voltage stops upon reception of pulse 15ra and levels off. This is voltage $E_{REF}$.

FIGURE 1G shows the voltage analog which is proportional to the time between transmission of the interrogation pulse 10ta and the reception of reply pulse 20ra. In this case, the linear voltage rise occurs at one-half the rate of that of FIGURE 1F and stops with the receipt of pulse 20ra and levels off at $E_{RPY}$. In the present case, since pulses 10ta and 15tb were initially synchronized, $E_{REF}=E_{RPY}$, which shows that $T_{RPY}=2T_{REF}$.

Figure 3:
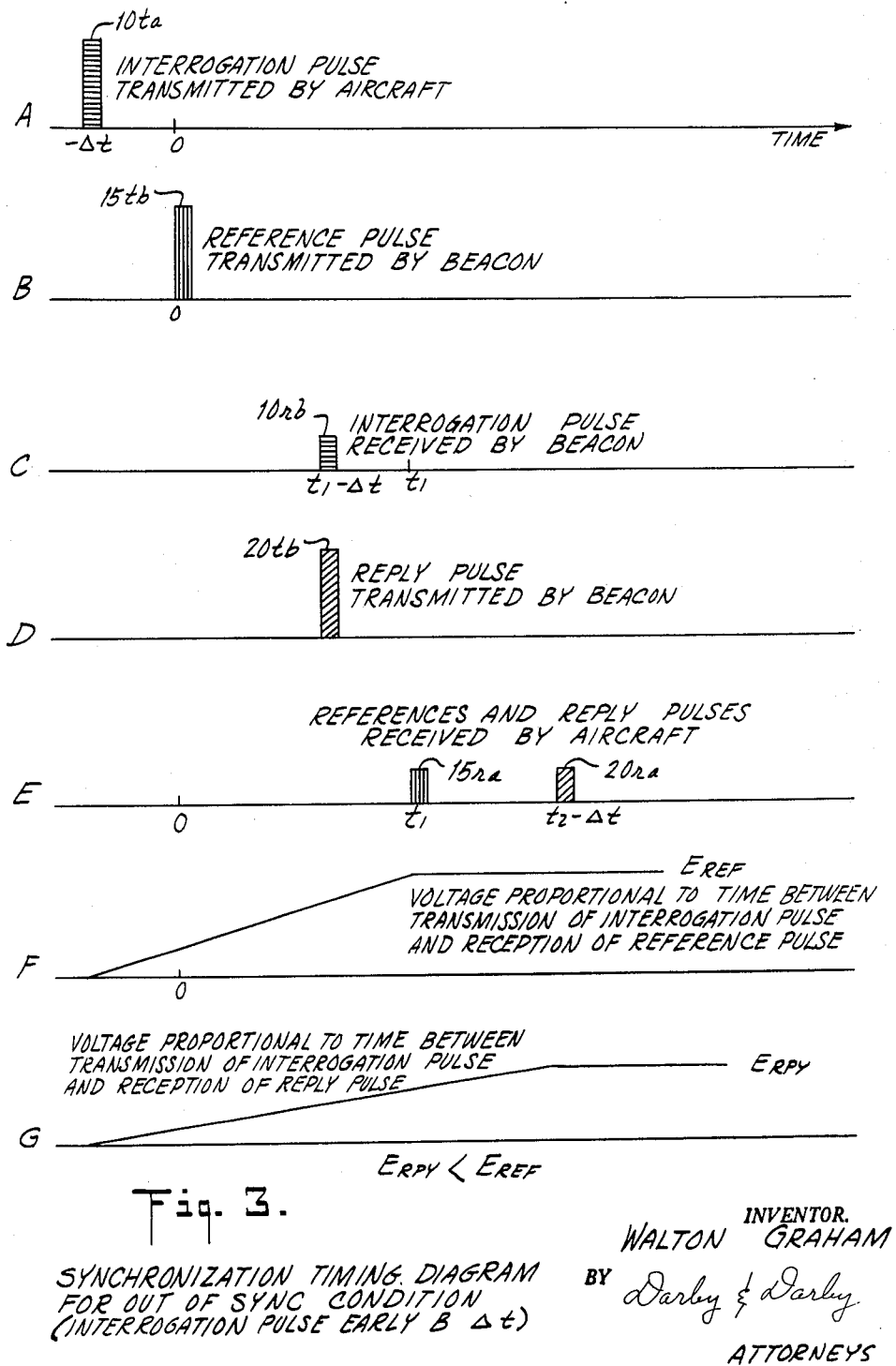
FIGURES 3A–3G show the time relationship of various pulses when the aircraft transmitter is not synchronized with the beacon transmitter due to the aircraft interrogation pulses leading the beacon reference pulse by a time $\Delta t$.

FIGURES 2 and 3 illustrate how an error voltage is developed when the interrogation and reference pulses are out of synchronism. In FIGURES 2A–2B, the interrogation pulse 10ta is shown transmitted later than the beacon reference pulse 15tb by a time $\Delta t$. The interrogation pulse 10ta travels to the beacon in a time $t_1$ and upon receipt of the interrogation pulse (FIGURE 2C) at time $t_1+\Delta t$ the beacon sends out reply pulse 20tb (FIGURE 2D). The reference pulse 15ra, transmitted by the beacon at $t=t_0=0$, is received by the aircraft at time $t_1$, as shown in FIGURE 2E, and the beacon reply pulse 20ra is received by the aircraft at time $t_2+\Delta t$.

The time between transmission of the interrogation pulse 10ta and reception of the reference pulse 15ra, called $T_{REF}$, is measured as shown in FIGURE 2F. It can be seen that the voltage analog $E_{REF}$ starts to be formed at time $\Delta t$, the time of transmission of interrogation pulse 10ta. $E_{REF}$ levels off at the time of reception ($t_1$) of reference pulse 15ra.

The time between transmission of interrogation pulse 10ta and reception of reply pulse 20ra, called $T_{RPY}$ is shown in FIGURE 2G. The voltage analog $E_{RPY}$ for this time which is formed at half the rate of $E_{REF}$, begins to be developed at time $\Delta t$, the time of transmission of interrogation pulse 10ta, and ends at the reception of the beacon reply pulse 20ra at time $t_2+\Delta t$. As can be seen, due to the late occurence of interrogation pulse 10ta, $E_{RPY}$ is greater than $E_{REF}$.

Comparing FIGURES 1 and 2, it is seen that $T_{RPY}=(t_2+\Delta t-\Delta t$ is unchanged by the loss of synchronization, but $T_{REF}=(t_1-\Delta t)$ is a function of the error in synchronization. When the interrogation pulse 10ta is late, the voltage $E_{RPY}$ is greater than $E_{REF}$. The other situation of interrogation pulse 10ta being early by the time $\Delta t$ is illustrated in FIGURE 3. In this case, $E_{REF}$ is greater than $E_{RPY}$.

Referring to FIGURES 3A and 3B, the beacon reference pulse 15tb, transmitted at $t=0$, lags the aircraft's interrogation pulse 10ta, transmitted at $t=-\Delta t$, by time $\Delta t$. At time $t_1-\Delta t$ (FIGURE 3C) interrogtion pulse 10rb is received by the beacon and the beacon transmits a reply pulse 20tb at the same time (FIGURE 3D). Reference pulse 15ra is received by the aircraft at time $t_1$ (FIGURE 3E). The time $t_1$ is equal to the slant range between the aircraft and the beacon divided by the velocity of propagation. Reply pulse 20ra is received by the aircraft at time $t_2-\Delta t$ (FIGURE 3E) since the interrogation pulse 10ta was early by time $\Delta t$.

FIGURE 3F shows the development of the voltage analog $E_{REF}$ proportional to the time ($T_{REF}$) between transmission of interrogation pulse 10ta and reception of reference pulse 15ra. The production of this voltage begins at the time, $t=-\Delta t$, of transmission of interrogation pulse 10ta, and terminates at time $t_1$, the reception of the beacon reference pulse 15ra. The development of $E_{RPY}$ is shown in FIGURE 3G. Here, the voltage, which is developed at half the rate of $E_{REF}$, is proportional to the time between transmission of interrogation pulse 10ta and reception of reply pulse 20ra, $T_{RPY}$. This voltage begins to be developed at time $t=-\Delta t$ and terminates upon reception of reply pulse 20ra, $t=t_2-\Delta t$. It can be seen, in FIGURES 3F and 3G, that for the situation of the interrogation pulse 10ta leading the beacon reference pulse 15tb, $E_{RPY}$ is less than $E_{REF}$.

Summarizing the unsynchronized conditions of the interfrogation and reference pulses shown in FIGURES 2 and 3, when the interrogation pulse is transmitted later than the beacon reference pulse, the pulses 15ra and 20ra received by the aircraft are spaced further apart, proportional to the amount of delay. This is manifested in the aircraft's time measuring circuits by $E_{RPY}$ being greater than $E_{REF}$. When the interrogation pulse transmitted by the aircraft leads the beacon reference pulse, the pulses received by the aircraft are spaced closer together. This is indicated in the analog time measuring circuits by $E_{RPY}$ being less than $E_{REF}$. In each case, for a given range $E_{RPY}$ will be the same, but $E_{REF}$ and hence their difference or ratio is dependent upon whether the interrogation pulse transmitted by the aircraft lags or leads the beacon reference pulse.

The above analysis was made with the aircraft assumed stationary with respect to the beacon transmitter. The analysis below takes into consideration the effects of aircraft motion with respect to the beacon transmitter and shows that the original analysis is still valid. Consider first that the interrogation and reference pulses 10ta and 15tb are synchronized, and that the aircraft has a component velocity, V, toward the beacon. The time $T_{REF}$ is now:

$$(1) \quad T_{REF} = \frac{R}{C} - \frac{VR}{C^2}$$

where R is the initial range and VR/C is the distance (to the first order), that the range changes during propagation of the reference pulse 20tb from the beacon to aircraft, and C is the velocity of propagation.

The time $T_{RPY}$ will now be:

$$(2) \quad T_{RPY} = \frac{2R}{C} - \frac{2VR}{C^2} = 2\ T_{REF}$$

The above analysis also hold for an aircraft having a component velocity away from the beacon and can be carried out by substituting $-V$ for V in this case.

Therefore, when the interrogation and reference pulses 10ta and 15tb are synchronized, the round trip interrogation pulse-reply pulse propagation time is twice the reference puulse propagation time from the beacon to the aircraft, with or without motion of the aircraft.

Figure 4:
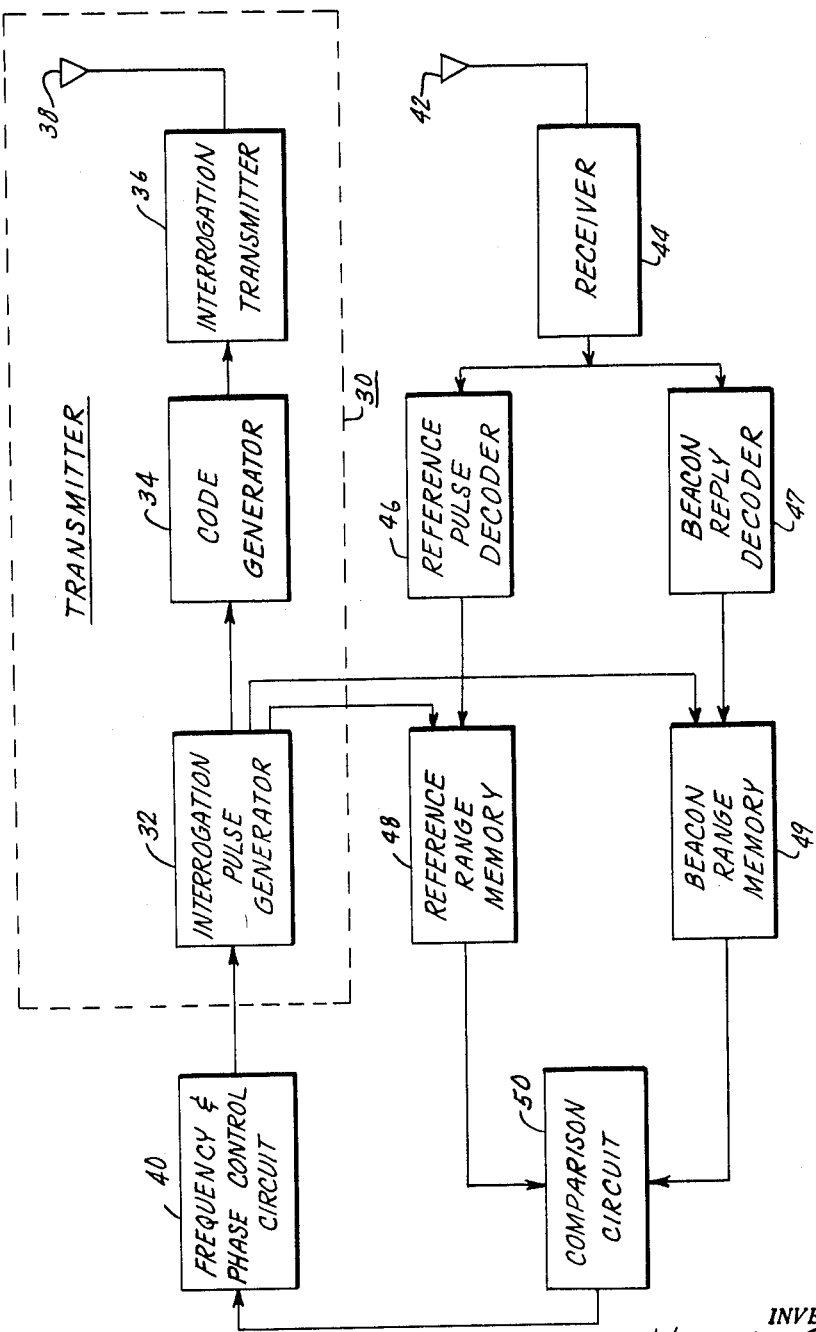
FIGURE 4 is a block diagram of the aircraft transmitter-receiver synchronization system.

Referring now to FIGURE 4, a system is shown for use in the aircraft for keeping the frequency and phase of the aircraft's interrogation pulse in synchronism with the beacon reference pulse. In FIGURE 4, the transmitter portion of the aircraft system is shown within the dotted rectangle 30. The transmitter has an interrogation pulse generator 32 which is any of the well-known forms of pulse generators, for example, a multi-vibrator circuit. The phase and frequency of the interrogation pulse generator circuit 32 is synchronized with the beacon reference pulse generator by a frequency and phase control circuit 40. The output of the interrogation pulse generator 32 is supplied to a code generator 34 where it may be encoded with aircraft altitude information. This may be accomplished by adding additional pulses at certain time intervals, or by other suitable methods, several of which are described later. The coded output from the code generator 34 is applied to the input of an interrogation transmitter 36 where it modulates a carrier wave. The modulated carrier wave is amplified to a suitable level and is transmitted into space by an antenna 38 to interrogate a ground beacon station (not shown).

The beacon transmits reference and reply pulses which are picked up by a receiving antenna 42 which is connected to the input of the radio navigation system receiver 44. The construction of a ground beacon station of the TACAN type is well known in the art and no further description is needed here. The receiver 44 has the usual conventional circuitry for amplifying the received pulse signals. The output of the receiver 44 is split into two paths, one going to the beacon reference pulse decoder 46 and the other to the beacon reply pulse decoder 47. The reply pulse which is transmitted by the beacon in response to a particular aircraft's interrogation pulse, is selected by that aircraft's beacon reply decoder 47 from reply pulses transmitted by the beacon in response to the interrogation pulses from other aircraft. This is accomplished in the beacon reply decoder 47 by the usual search-track circuits which are common in TACAN navigation receivers. This is described in detail in the afore-mentioned article "Principles of TACAN."

The output of the beacon reply decoder 47, which is the selected reply pulse, shown as pulse 20tb in FIGURES 1, 2 and 3, is applied to the input of a beacon (reply) range memory circuit 49. Memory circuit 49 also receives interrogation pulses at another one of its inputs from the interrogation pulse generator 32. The reply range memory circuit 49 measures the time interval between the transmission of the interrogation pulse and the reception of the reply pulse from the beacon, in the same manner as in a conventional TACAN receiver, and produces the $E_{RPY}$ voltage therefrom. As previously stated, the range circuit 49 can include a capacitor which charges during the time interval between these two pulses. For example, the occurrence of an interrogation pulse from the generator 32 may open a gate circuit which connects the capacitor to a source of charging potential.

The capacitor then charges at a rate dependent upon its time constant circuit. The appearance of a reply pulse at the output of the beacon reply decoder 47 then terminates the charging of the capacitor by closing the gate circuit. A voltage therefore appears on the capacitor which is proportional to the elapsed time between the transmission of the interrogation pulse and the reception of the reply pulse.

In a similar manner a reference pulse decoder circuit 46 selects the beacon reference pulse. The decoder 46 is identical in every aircraft operating with a particular beacon since these aircraft are only interested in the reference pulses from this particular beacon. In general, each beacon transmits at a specific assigned operating frequency, so that the receiver 44 can be tuned to receive only the transmissions from the desired beacon.

The output of the reference pulse decoder 46 is connected to the input of the reference range memory circuit 48, which also receives as a second input the output of the interrogation pulse generator 32. The reference range memory circuit 48 is similar to the beacon range memory circuit 49 and measures $T_{REF}$ by producing the $E_{REF}$ voltage and operates in a manner similar to the reply range memory circuit 49. However, the circuit 48 charges at twice the rate of circuit 49 in order to make $E_{REF} = E_{RPY}$ when $T_{RPY} = 2T_{REF}$: i.e., when the reference and interrogation pulses are synchronized.

The outputs of the memory circuits 48 and 49 are applied to the input of a comparison circuit 50 which compares the two output voltages, preferably by taking the difference between them, and applies the resultant error voltage to the frequency and phase control circuit 40. The difference circuit may be any suitable circuit, a variety of which is already known to those skilled in the art. The magnitude and polarity of the error voltage which is produced by the comparison circuit 50 determines the correction to be made to the frequency and phase of the output of the interrogation generator 32. As previously described, when the interrogation pulse and beacon reference pulse are in synchronism $E_{REF} = E_{RPY}$. In this instance, the comparison circuit 50 has no output and there is no signal applied to the frequency and phase control circuit 40 to change the frequency and/or phase of the interrogation pulse generator 32. When the interrogation pulse is not in synchronism with the beacon reference pulse, $E_{RPY}$ is greater or less than $E_{REF}$. This means that circuit 50 produces an error voltage which is supplied to the frequency and phase control circuit 40.

The system shown in FIGURE 4 compares the time differences between $T_{RPY}$ and $T_{REF}$ and adjusts the frequency and phase of the interrogation pulse generator 32, so that $T_{RPY} = 2T_{REF}$. In actual practice, a fixed delay $\Delta t_B$ occurs in the beacon to allow for decoding the interrogation pulse received from the aircraft. This delay is common to all beacons and is compensated for in the aircraft by initiating measurement of $T_{RPY}$ and $T_{REF}$ at $\Delta t_B$ seconds before transmission of the interrogation pulse. This can be accomplished by any suitable means, such as a delay line. The servo system of FIGURE 4 then works as previously described.

Figure 5:
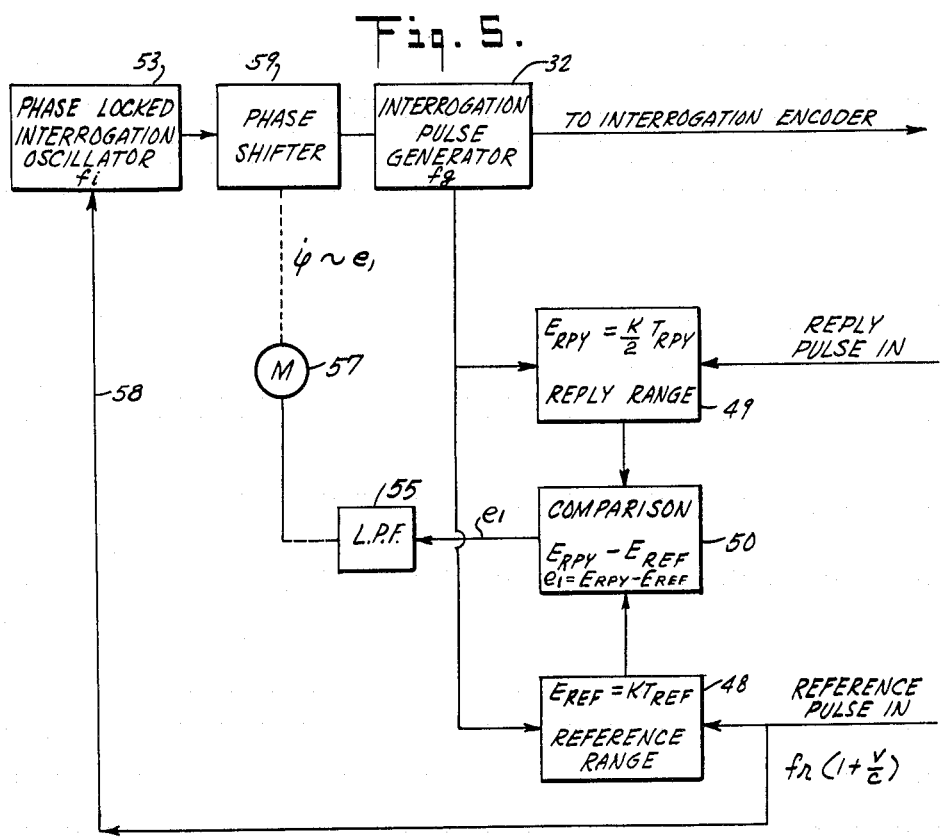
FIGURE 5 is a detailed block diagram of the frequency and phase control circuit of FIGURE 4.

In FIGURE 5, a servomechanism loop is shown for use with the system of FIGURE 4 for maintaining synchronism between the interrogation and reference pulses. The system of FIGURE 5 compensates for the effect of aircraft motion on the synchronization of the pulses. In FIGURE 5, consider that the beacon is transmitting reference pulses at a pulse rate $f_r$. Due to the motion of the aircraft, this rate is shifted upon reception, by the doppler effect, to a new rate $f_i$.

The frequency of the pulses picked up by the aircraft receiver, considering the doppler effect to the first order, is given as follows:

(3) $$f_i = f_r\left(1 + \frac{V}{C}\right)$$

In FIGURE 5, the received reference pulses at rate $f_i$, which are separated out by the reference pulse decoder 46 of FIGURE 2, are supplied to the reference range circuit 48. Reference range circuit 48 also receives pulses from the interrogation pulse generator at a frequency $f_g$. As described with respect to FIGURE 4, range circuit 48 produces a voltage $E_{REF}$ which is proportional to the time between the production of an interrogation pulse by the generator 32 and the reception of a reference pulse from the beacon. This voltage is designated $$E_{REF} = KT_{REF}$$

where K is a constant. Similarly, the beacon reply pulses are separated out by the reply pulse decoder 47 and applied to the reply range circuit 49 which generates a voltage $$E_{RPY} = \frac{K}{2}T_{RPY}$$

This means that circuit 49 operates at one-half the rate of circuit 48. The outputs of the reference and reply range circuits 48 and 49 are applied to the comparison circuit 50 which takes the difference between the two voltages $E_{RPY} - E_{REF}$ and produces an error voltage. The error voltage is smoothed out in a low pass filter 55 and then used to control a motor 57. Motor 57 drives a phase shifter network 59, which is connected to the output of the phase locked interrogation oscillator 53.

Oscillator 53 operates at a frequency $f_i$, which is the repetition rate of the received beacon reference pulses after taking the doppler effect into account. The oscillator 53 is locked onto this frequency in a well-known manner by the reference pulses received by the aircraft and supplied over line 58. The phase of the oscillator 53 output is controlled by phase shifter 59.

Since the reference pulses are generated at the beacon at a frequency $f_r$, which is different from the frequency $f_i$, of the interrogation pulses produced by the aircraft oscillator 53, the interrogation and reference pulses drift out of synchronism. This drift is detected in the comparison circuit 50, in the manner described with respect to FIGURE 4 and in accordance with the analysis evolved with respect to FIGURES 1, 2 and 3.

The drift of the interrogation and the reference pulses is corrected by the phase shifter network 59 which is driven by the motor 57 in response to the comparison circuit 50 error signal. In a time T seconds the two pulses drift apart by a time $\tau_1$ given by:

(4) $$\tau_1 = +\frac{f_d}{f_i}T = +\frac{f_r VT}{f_i C}$$

where $f_d$ is the doppler shift in $f_1$:

(5) $$f_d = f_r\frac{V}{C}$$

and $f_d/f_i$ in the resulting fractional change in frequency.

In order to compensate for this drift, a compensating phase change must be introduced by the phase shifter 59. The phase shifter 59 produces a time shift in the production of the interrogation pulse of $\tau_2$:

(6) $$\tau_2 = \frac{1}{f_i}\frac{\varphi}{2\pi}$$

where $1/f_i$ is the period of the frequency $f_i$, and $\varphi/2\pi$ is the fraction of the period due to a phase shift of $\varphi$ radians.

For synchronism to be maintained $$\tau_1 = -\tau_2$$

or (7) $$\frac{1}{f_i}\frac{\varphi}{2\pi} = -\frac{f_r VT}{f_i C}$$

giving (8) $$\frac{\varphi}{2\pi T} = -\frac{f_r V}{C} = \frac{\dot{\varphi}}{2\pi}$$

where $\varphi/2\pi$ is the equivalent frequency of the phase change $\varphi$ in time T.

If $f_g$ is the resulting rate of the interrogation pulse generator 32:

(9) $$f_g = f_i + \frac{\dot{\varphi}}{2\pi} = f_i - f_r\frac{V}{C}$$

Substitution of $$f_i = f_r\left(1 + \frac{V}{C}\right)$$

Gives:

(10) $$f_g = f_r\left(1 + \frac{V}{C}\right)$$

or

(11) $$f_g = f_r$$

This shows that the interrogation pulse rate and phase from the generator 32 and the reference pulse from the beacon are identical.

Up to this point only the operation of aircraft with a single ground station has been considered. In practice, aircraft in close proximity to one another may interrogate different ground stations and these interrogations will not be synchronous unless the ground stations themselves have synchronous reference pulses. Since, ordinarily, the ground stations are beyond line of sight of each other, they are unable to receive each other's reference pulses and are therefore not able to synchronize on them. It is therefore necessary to find another means to synchronize all of the beacon stations so that the reference pulses are transmitted in synchronism.

One simple and effective means of accomplishing the required synchronization of the reference pulses of the beacon stations is by the use of auxiliary VLF (very low frequency) radio transmissions. These auxiliary CW (continuous wave) transmissions are received by the beacon stations and used to synchronize them in a well known manner in which differences in distance between the beacons and the CW transmitter are compensated for by introducing fixed delays. In an article by John A. Pierce entitled "Intercontinental Frequency Comparison by Very Low Frequency Radio Transmission" appearing in the June 1957 edition of the Proceedings of the Institute of Radio Engineers at pages 794–803, it was disclosed that measurements made over a trans-Atlantic path (5400 kilometers) using a frequency of 16 kilocycles, (16,000 cycles) showed that the diurnal variation in transmission time has a standard deviation of the order of 2 microseconds from a mean curve. The overall deviation is 34±1 microsecond.

In the airborne navigation system of the present invention it is unnecessary to maintain synchronism over distances of the magnitude of 5400 kilometers since it is necessary that only the beacons which can possibly serve the same aircraft be synchronized. This means that the range between beacons is of the order of 400 miles and the variation in transmission time between such stations should be proportionately less than over the longer path. It is therefore possible by using the VLF transmissions to maintain synchronism of the beacons within one microsecond between stations requiring synchronism. This can be done with a simple programmed diurnal correction. Also, as is derived from Pierce's article, the transmitting power required of a centrally located VLF station which synchronizes all the beacons in the continental United States is less than 10 watts and the bandwidth required by such VLF service is less than 1 cycle per second.

Another means of synchronizing the beacon reference pulses is by using artifical satellites. In this instance the satellite is preferably of the type which is in a circular orbit in the equatorial plane of the earth with a 24 hour period. Communication transmissions are reflected from the satellite and used parasitically by the beacons to maintain synchronism. For example, a pulse code modulation system having timing pulses can be used as reference pulses for the beacons. Since the range of each beacon to the satellite would be known, synchronism can be accomplished by having each station add a time delay to the transmission of its reference pulse which is equal to the difference between its own delay and the maximum delay of any beacon in the system. In this manner, all of the beacons are synchronized.

A third way of maintaining synchronism of the beacon reference pulses involves the use of additional equipment in the aircraft itself. It is only important for beacon stations to be synchronized when there are aircraft within line of sight of two or more beacons which are capable of triggering reply pulses from both beacons. It should be realized that TACAN transmissions are normally limited to line of sight and that aircraft within line of sight of only one beacon must use that particular ground station. Therefore, a ssytem which depends for synchronization upon the presence of and transmissions from such aircraft can be realized. In accordance with the operation of the aircraft synchronization system described in FIGURES 4 and 5, when any aircraft is in the track mode all its interrogation pulses are synchronized with the beacon reference pulses of the beacon with which it is operating. It should be realized, however, in the TACAN system that when the aircraft is in the track mode the average pulse rate of the interrogation pulses is 22.5–30 cycles per second rather than the 135 cycles per second transmitted when the aircraft is in the search mode: i.e. searching for its own reply pulses. An aircraft which is in the track mode can therefore operate as a beacon itself for the purpose of synchronizing another transmitter, such as a beacon transmiter. Thus, if each beacon station has a receiver which is tuned to the frequency at which the aircraft interrogates other beacon stations, each beacon station will receive the interrogation pulses from aircraft operating with the other beacon stations and operate with these pulses as if they were reference pulses from a beacon station. Stated another way, the beacon also transmits a coded interrogation pulse to the aircraft, either on the frequency of the beacon with which it is synchronizing or on the frequency on which the aircraft is interrogating.

The aircraft responds to the reception of the coded interrogation pulse from the beacon by transmitting a coded reply pulse. The coded interrogation pulse from the beacon is accepted only by an aircraft at a single altitude and the coded reply pulse from the aircraft is accepted only by the beacon. The interrogation pulse transmitted by the beacon, and the reply and reference pulse transmitted by the aircraft are used at the beacon to bring the beacon interrogation pulse into synchronism with the aircraft coded reference pulse and hence with the true reference pulses of another beacon, in the same way that the reference, interrogation, and reply pulses are used to bring the aircraft interrogation pulse into synchronism with the beacon reference pulse.

It should be noted that synchronization of all beacon stations enables each aircraft to measure range to all beacons within line of sight while interrogating only one of them to maintain synchronism of the aircraft interrogation pulse with the beacon's reference pulse. This means that simultaneous range measurement to a number of fixed beacons is possible. A superior accuracy navigation fix can therefore be attained without the use of the TACAN system's bearing facility.

When the timing of the beacon reference pulses is shifted to maintain synchronism between beacon stations it is also necessary to adjust the drive of the rotating antenna pattern at the beacon so the relationship between the time of the occurrence of the maxima in the antenna pattern and of the reference pulses is preserved. Since the antenna pattern has a known shape, and the antenna is frequently a rotating cylinder structure, it is simple to accomplish this, for example, by a servo system which controls the speed and phase of the antenna in accordance with the reference pulses. Such systems are well known in the art and need not be described here.

It has been described above, how the transmitters of all aircraft are synchronized with the same ground beacon transmitter or as shown below with a plurality of synchronized ground beacon transmitters, so that all the interrogation and the reference pulses are transmitted at the same time. In essence, the beacon reference pulses serve as a standard to which all the aircraft transmitters are synchronized. Once the aircraft transmitters are synchronized with the same or a plurality of synchronized beacon transmitters, the measurement of range between aircraft with synchronized transmitters is readily accomplished. All that is necessary is to provide each aircraft with a range receiver for picking up the interrogation pulses from the other aircraft and usual circuits for measuring the time between the occurrence of a local interrogation pulse (which occurs simultaneously with transmission of an interrogation pulse from another aircraft) and the reception of the pulse from the other craft. Since the interrogation pulses of all aircraft are synchronized, the measuring aircraft is provided with the initial point of a time base for measuring this time interval. The range between aircraft is merely the velocity of propagation of the signal multiplied by the measured time interval.

Describing a typical example of range measurement, consider that the measuring aircraft has a range receiver and an A-scope radar display and measuring system. The time measuring interval in the measuring aircraft is initiated by the transmission of its own interrogation pulse. At the same time, the aircraft whose distance is to be measured also transmits an interrogation pulse. When the interrogation pulse from the aircraft whose distance is to be measured is received, it is displayed on the face of the A-scope. The time and hence the range is then measured by conventional radar measuring techniques.

Typical circuits for conversion of time differences to range indications may be found in "Radar Systems Engineering" by Ridenour at p. 527 ff. and also in other standard texts of this nature. It should be noted that there is a difference between range measurements in the present system and that of a conventional radar system, since in the present system there is only one-way propagation of pulses from aircraft to aircraft, whereas in radar there is a two-way propagation of pulses from the transmitter to the reflecting object and back to the transmitter. As a result, in the present system a given time difference on the face of an A-scope corresponds to twice the range of that displayed on a conventional radar scope and is calibrated accordingly. It should also be realized that range may be displayed on a direct reading, digital type meter in a well known manner.

The receiver in each aircraft which receives the interrogation pulses transmitted by other aircraft need only be a low gain, wide band receiver. The gain of the receiver can be relatively low because each aircraft requires reception only out to a range necessary to avoid collision. This range varies in accordance with the relative speeds of the aircraft and can be varied accordingly, but in general is from 20–30 miles. If the present system is to be utilized with the existing TACAN system, the bandwidth of the aircraft receiver would extend from 1025 to 1150 mc., covering the presently existing 126 air-to-ground transmission channels.

As described above, once the pulses of the aircraft transmitters have been synchronized, each aircraft may readily determine the range from every other aircraft within the range of the low gain, wide band receiver of its range measuring equipment. In order to provide information for the collision avoidance system it may be desirable that each aircraft be able to ascertain the bearing to every other aircraft in the collision area. This may be accomplished by connecting an interferometric measuring device to the wide band receiver of the range measuring circuits. The interferometric device makes angular bearing measurements from the interrogation pulses received from other aircraft. Any suitable system may be utilized to obtain the bearing information. One such system is described in the "Proceedings of the Institute of Radio Engineers," June 1956, at page 755, where the measurement of the angle of the transmitter with respect to a set of radio receivers is accomplished by measuring the phase differences between signals at the receivers. It should be recognized that other suitable types of interferometric/devices may also be utilized.

The above discussion is based on the premise that two aircraft are not at the same range from a beacon station. When this does occur, and both aircraft interrogate simultaneously the beacon will fail to reply. The effect due to this type of interference may be substantially reduced merely by modifying the timing of the aircraft interrogation-pulses as explained below. Consider that when an aircraft is in the track mode of operation it interrogates at a rate of 22.5 times per second. This rate is exactly ⅙ the rate of the beacon reference pulses. In general, each aircraft does not transmit a pulse every successive $\frac{1}{22.5}$ seconds, but slects at random one of six instants every period of $\frac{1}{22.5}$ seconds. In the present invention, the beginnings of the six sub-intervals occurring every $\frac{1}{22.5}$ seconds are made coincident in time with the transmission of beacon reference pulses. Stated another way, each $\frac{1}{22.5}$ second major interval is divided into six sub-intervals making each sub-interval occur every $\frac{1}{135}$ seconds. The beginning of each of the sub-intervals is made coincident with the transmission of a beacon pulse, by synchronizing the interrogation pulses, transmitted at the rate of 22.5 pps., with the beacon reference pulses in the manner previously described.

During successive $\frac{1}{22.5}$ second periods an aircraft can interrogate at any one of the six sub-intervals. For example, during the first major $\frac{1}{22.5}$ second interval, the synchronized transmission may occur at the second beacon reference pulse at time $t=\frac{1}{135}$ seconds, and during the second major interval of the transmission of the interrogation pulse may occur at the fifth sub-interval which corresponds to time of the beacon reference pulse at $t=\frac{11}{135}$ seconds. Since random transmission of interrogation pulses by aircraft at the same range is not likely to occur at the same sub-interval during each major $\frac{1}{22.5}$ second interval, the probability is that only one reply pulse in six will be lost due to the presence of one other aircraft at the same range from the beacon. This is true becacuse of the probability that only one interrogation pulse out of six from both aircraft will be simultaneously received by the beacon. When three aircraft are at the same range from the beacon, the probability would be that each receives beacon reply pulses to five out of every nine interrogation pulses, on the average.

Transmission utilizing random selection of one of the six sub-intervals during each $\frac{1}{22.5}$ second major interval may be accomplished with a system similar to the one shown in FIGURE 4. In that system, the interrogation pulse generator 32 would operate at 135 pulses per second and would by synchronized to the beacon reference pulses in the manner previously described. A randomly actuated gate (not shown) is interposed between the interrogation pulse generator 32 and the transmitter 36. The gate passes one interrogation pulse to the transmitter 36 at a randomly varying $\frac{1}{135}$ second sub-interval during each $\frac{1}{22.5}$ second interval. Any gating arrangement of conventional type suitable for this operation, or the one described in detail later may be used. It should be realized that the range and bearing measurements may be accomplished with this type of system in the manner previously described. In a preferred form of the invention, the aircraft transmitter is only synchronized during track mode of operation and is not synchronized during search mode.

Figure 7:
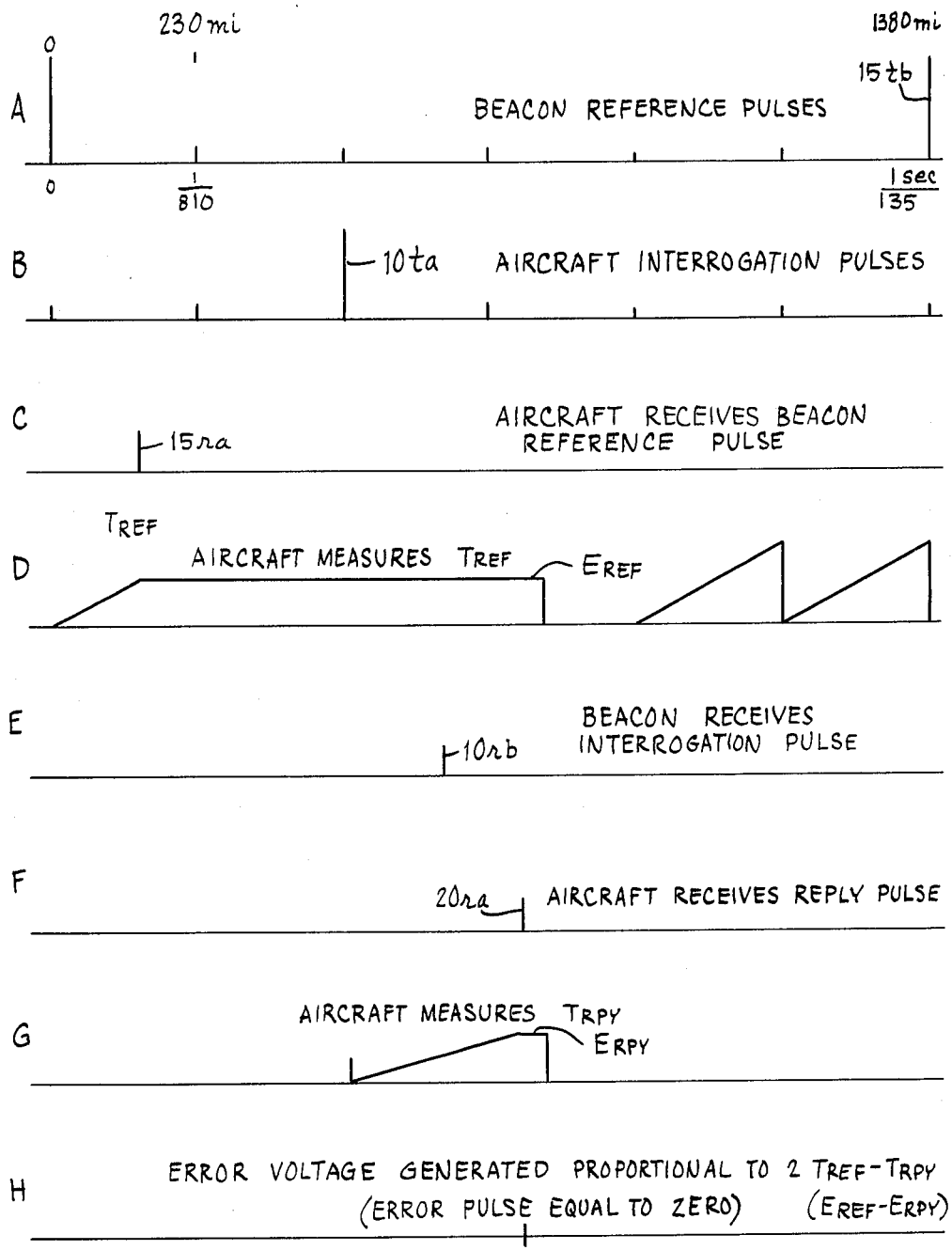
FIGURES 7A–7H show the timing relationships of the pulses in a modification of the system, when the interrogation pulse transmitted from the aircraft is in synchronism with the reference pulse from the ground station.
Figure 9:
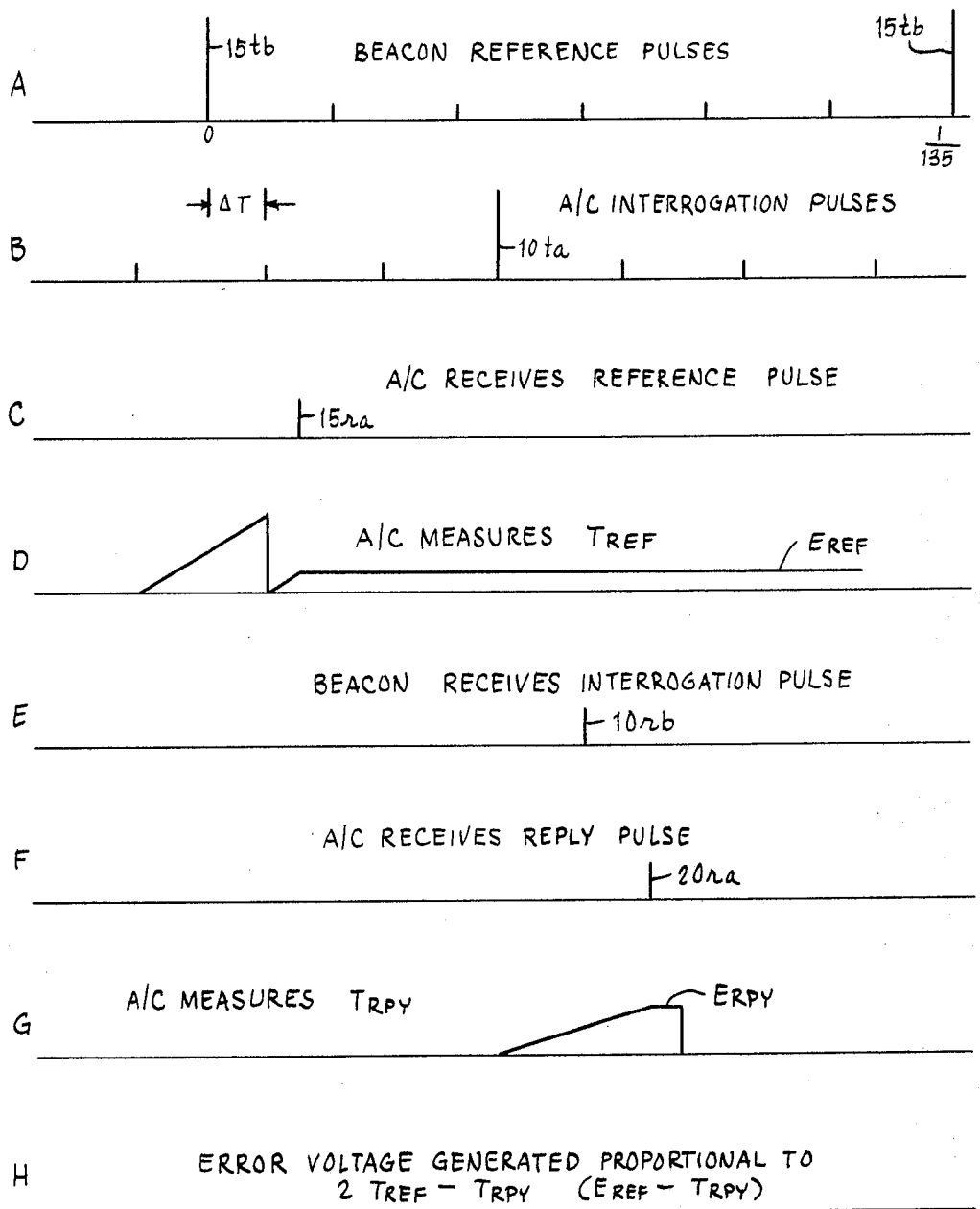
FIGURES 9A–9H show timing relationships for the system of FIGURE 7 in which the interrogation pulse lags the ground station reference pulse by a time $\Delta t$.

In order to increase the data transmission capacity of the system and to realize the full traffic handling capability of a ground station to which a number of aircraft are synchronized, the timing of the pulse transmissions shown in FIGURES 7, 8 and 9 may be used. By utilizing this timing arrangement full traffic handling capability of the ground station is realized and the interference between aircraft transmitting to the same beacon is further reduced. Again, the specific pulse timing sequence can be obtained using techniques and circuits well known in the art.

Referring now to FIGURES 7–9, when every aircraft transmits interrogation pulses synchronously with one of the beacon reference pulses, all interrogation pulses arrive at the beacon within a time interval following each reference pulse of $230 \times 5.36 = 1234$ microseconds; where 230 is considered to be the maximum range of an interrogating aircraft in miles and 5.36 is the reciprocal velocity of light in microseconds per mile. Since the spacing between beacon reference pulses is $\frac{1}{135}$ seconds, 7,400 microseconds, it is apparent that all the interrogation pulses will arrive at the latest in a fraction $\frac{1234}{7400}$ of the time available for transmission of reply pulses. This means that there is a consequent reduction of traffic handling capacity since beacon reply pulses cannot be transmitted during this fractional period. This difficulty is overcome by again increasing the allowable instants (positions) of transmission of interrogation pulses by a predetermined factor, in the example system to be described, the factor being six. In other words, instead of permitting each aircraft in the track mode to select at random one of only six instants every $\frac{1}{22.5}$ seconds to transmit an interrogation pulse, as previously described, the interrogation pulse at any one of these six instants being synchronized with the beacon reference pulse whose rate is 135 cycles per second, each aircraft is now permitted to select at random one of 36 instants (positions) every $\frac{1}{22.5}$ seconds. The period between reference pulses $\frac{1}{135}$ seconds, is therefore divided up into six sub-intervals of $\frac{1}{810}$ seconds. The aircraft interrogation pulses will then be synchronous with the beacon reference pulses at integral sub-multiples of $\frac{1}{135}$ seconds which, in the present example, are at integral multiples of $\frac{1}{810}$ seconds between the reference pulses. Stated another way, every sixth allowable interrogation pulse transmission sub-interval position is in synchronism with a beacon reference pulse and the other sub-intervals occur every $\frac{1}{810}$ seconds between two adjacent beacon reference pulses. Utilizing this timing sequence it is also possible to obtain range and bearing measurements in the manner previously described. The transmission sequence for this arrangement is shown in FIGURES 7–9.

FIGURE 7 is directed to the situation wherein the six sub-intervals for interrogation-pulse transmission are synchronized with the beacon reference pulse. In FIGURE 7A, the beacon reference pulses $15tb$ are shown occurring every $\frac{1}{135}$ seconds. Line A also shows a time scale of $\frac{1}{810}$ seconds indicating the six evenly spaced $\frac{1}{810}$ second sub-intervals between beacon reference pulses. The aircraft interrogation pulses $10ta$ can occur at any integral multiple of $\frac{1}{810}$ seconds, as for example, as shown in FIGURE 7B, one occurs at the second sub-interval after the transmission of the beacon pulse at time $\frac{2}{810}$ seconds.

In FIGURE 7C the beacon reference pulse is received by the aircraft at time=$T_{REF}$ which, due to the range of the aircraft from the beacon will be less than $\frac{1}{810}$ seconds. FIGURE 7D shows the production of $E_{REF}$ to measure $T_{REF}$. This is accomplished by initiating a sawtooth wave every $\frac{1}{810}$ seconds at the beginning of each sub-interval. This may be done, for example, by starting to charge a capacitor every $\frac{1}{810}$ second and discharging the capacitor at the end of the $\frac{1}{810}$ second sub-interval. In the sub-interval during which the aircraft receives the reference pulse, the sawtooth is held at a voltage $E_{REF}$ which is proportional to the time $T_{REF}$. This may be accomplished in a manner similar to that previously described by charging a capacitor in a sawtooth manner and terminating the charging upon the reception of a reference pulse. The voltage $E_{REF}$ is held in the reference range memory circuit until a comparison with the $E_{RPY}$ voltage is to be effected.

In FIGURE 7E, the beacon receives interrogation pulse 10$rb$ and transmits a reply pulse which is received by the aircraft some time later (FIGURE 7F). To measure $T_{RPY}$ the aircraft initiates a sawtooth, for example, by charging a capacitor, at the time of transmission of each interrogation pulse and terminates the charge upon receipt of the beacon reply pulse 20$ra$ (FIGURE 7G). As has been previously described, $E_{RPY}$ is formed at half the rate of $E_{REF}$. This means that the capacitor, or other circuit, which forms $E_{RPY}$ charges at half the rate of the one used to measure $E_{REF}$.

The system, whose timing diagrams are shown in FIGURES 7–9, functions in the same manner as that previously described with respect to FIGURES 1–5, namely, when $2T_{REF}=T_{RPY}$ no error voltage produced. When an error voltage is produced, due to $2T_{REF}$ not being equal to $T_{RPY}$, the error voltage acts through a frequency and phase lock servo loop to shift the interrogation pulse to one of the six allowable transmission positions between beacon reference pulses, i.e., bring the sub-intervals for allowable interrogation pulse transmision into synchronism with the sub intervals between beacon reference pulses.

FIGURES 8 and 9 show the production of error signals which are of opposite polarities and varying magnitudes. The polarity and magnitude of the error signal depends upon whether the interrogation pulses are early or late (leading or lagging) with respect to the beacon reference pulses or their submultiples and the amount of time lead or lag. In FIGURE 8, the condition is shown where the interrogation pulse is earlier than the beacon reference pulse sub-multiples by a time $\Delta t$. This is shown in FIGURES 8A and 8B. The aircraft generates a sweep every $\frac{1}{810}$ seconds in order to operate the $T_{REF}$ time measuring circuits. The beginning of the sweep is coincident with the sub-multiples of the aircraft interrogation pulses, which now lead the sub-multiples of the beacon reference pulse by time $\Delta t$. The generation of $E_{REF}$, which is representative of $T_{REF}$, is shown in FIGURES 8C and 8D. A charging sawtooth starts at $t=\Delta t$ before each of the six sub-intervals between beacon reference pulses. The charging during a sub-interval is terminated upon receipt of the reference pulse, as shown in FIGURE 8D.

In FIGURE 8G the sawtooth for measuring $T_{RPY}$ is initiated upon the transmission of the aircraft interrogation pulse (FIGURE 8B). Again, this sawtooth charges at half the rate of the one for FIGURE 8D. When the beacon receives interrogation pulse 10$rb$, it transmits a reply pulse which is received by the aircraft some late time. The reception of the beacon reply pulse terminates the sawtooth measuring $T_{RPY}$. When the voltages shown in FIGURES 8D and 8G are measured in a difference circuit, an error voltage is produced, of positive polarity, which is proportional to $2T_{REF}-T_{RPY}$. This is shown in FIGURE 8H. This error voltage is used to control a servo loop to bring the transmission of the interrogation pulse into synchronism with the beacon reference pulse or sub-multiples thereof. When this condition occurs, no error voltage is generated, as shown in FIGURE 7.

FIGURE 9 shows the generation of an error voltage which is opposite in polarity to the error voltage of FIGURE 8. This occurs when the aircraft interrogation pulse lags one of the beacon sub-intervals by time $\Delta t$. This is shown in FIGURES 9A and 9B. As shown in FIGURES 9C and 9D the sawtooth for measuring $T_{REF}$ is initiated on every sub-multiple of the aircraft interrogation pulse and is terminated when the aircraft receives the reference pulse 15$ra$. FIGURE 9G shows the sawtooth for measuring $T_{RPY}$ which is initiated on the transmission of the aircraft interrogation pulse (FIGURE 9B). The beacon receives the aircraft interrogation pulse and transmits a reply pulse which terminates the sawtooth sweep when the aircraft receives it (FIGURE 9F). When the voltages shown in FIGURES 9D and 9G are applied to the difference circuit the error voltage is of negative polarity, since $E_{RPY}$ is greater than $E_{REF}$. This is shown in line H. Again, the error voltage is utilized to control a frequency and phase look servo loop so that the aircraft interrogation pulse is brought into synchronism with the beacon reference pulses. When this happens no error voltage is produced and the aircraft interrogation pulse is synchronized to a beacon reference pulse or a sub-multiple thereof.

The embodiment of the invention described with respect to FIGURES 7–9 produces a number of other advantages in addition to increasing traffic handling capacity. One of these advantages is a reduction in the time it takes to bring the aircraft transmitter into effective synchronism with the beacon after it has locked onto one beacon and goes into the track mode of operation. This occurs because the maximum time error of synchronism is reduced from $\frac{1}{135}$ second to $\frac{1}{810}$ second. Slewing time in search mode; i.e., searching for and locking onto the correct reply pulse in response to your own interrogation pulse, is proportional to the time error.

Another advantage obtained is that the probability of interference between two aircraft triggering the beacon from the same range is reduced by an additional factor of six. This is true because there are now 36 time slots to choose from for the transmission of each interrogation pulse in the track mode, rather than six. This is in effect saying that the traffic handling capacity of the ground station is increased by a factor of six. For the same reason, the probability of interference between two or more aircraft at the same range from another aircraft is reduced by the same factor.

A system utilizing the timing sequences shown in FIGURES 7–9 may be constructed along the lines of that shown in FIGURE 4. In this system, the interrogation-pulse generator 32 is adjusted to produce pulses at an 810 pulses per second rate. The generator 32 is synchonized to the beacon reference pulses by the frequency and phase control circuit 40 in the manner previously described. The reference range memory 48 is triggered by each pulse from the generator 32. However, the reply range memory 49 is now triggered by the interrogation pulse at the output of the transmitter 36. A randomly actuated gate (not shown) is interposed between the generator 32 and the transmitter 36. With the aircraft in track mode, the gate passes an interrogation pulse to the transmitter 36 at a randomly chosen $\frac{1}{810}$ second sub-interval during each $\frac{1}{22.5}$ second interval. A gating arrangement suitable for this operation is described in detail later. It should be realized that range and bearing measurements may be accomplished with this type of system, in the manner previously described. Again, the system is preferably not synchronized during search mode of operation.

In order to complete the information necessary for pilot warning or collision avoidance it is necessary that the altitude of each craft be ascertainable with respect to every other aircraft or, absolutely, with respect to a fixed reference level. Several systems are already in existence for providing altitude information. One such system which transmits altitude information by the spacing of a pair of pulses is illustrated in an article entitled "Background and Principles of TACAN Data Link" by Alexander, Renick and Sullivan in Transactions of the Institute of Radio Engineers, Transactions for the Professional Group on Aeronautical and Navigational Electronics, March 1959, pages 9–16. FIGURE 7 of that article illustrates one method which may be utilized. The system described in that article is similar to the addition of a third pulse, whose spacing is proportional to the aircraft's altitude, to the interrogation pulse pair which is normally transmitted by the aircraft.

It is desirable to transmit the altitude data without the use of additional pulses. One way of accomplishing this according to the present invention is by the pulse transmission timing arrangement illustrated in FIGURE 6 and described below. A system using the timing sequence shown in FIGURE 6 also has the additional advantage of making it unnecessary for each aircraft to decode all transmissions from other aircraft in order to separate out the pertinent transmissions from aircraft at or near the altitude of the first aircraft. In this type of arrangement ground stations can also separate out transmissions from aircraft at different altitudes without additional decoding equipment. It should be noted that the system to be described for transmitting altitude data is a further modification of the timing sequence described with respect to FIGURES 7–9.

Figure 6:
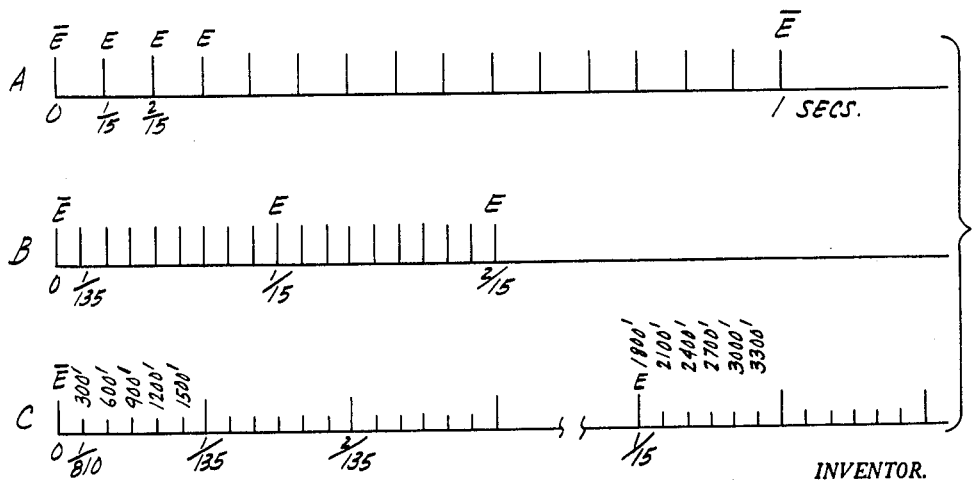
FIGURE 6 shows the timing of pulses for altitude information transmission.

The system whose timing pulses are shown in FIGURE 6 operates by restricting the transmission of interrogation pulses at certain allowed transmission positions (times) to aircraft at particular altitudes. It should be apparent that the pulses of the timing sequences shown in FIGURE 6 and the other figures may be produced by any suitable circuits which are well known in the pulse generation art.

Referring to FIG. 6A the base line is marked off in one-fifteenth second intervals corresponding to the times in a TACAN system at which the beacon transmits east reference pulses (E). The E pulses are transmitted by the beacon along with the beacon reference pulses, which are transmitted every $1/135$ second. The E pulses are made distinguishable from all of the other pulses transmitted by the beacon by transmitting them in a certain manner, for example by transmitting a group consisting of 12 pulses, each a 12-microsecond twin pulse, spaced exactly 30 microseconds apart, every $1/15$ of a second. The coded transmission of the E pulses permits decoding and recognition at the aircraft receiver. The coded transmission may be, and is in many conventional beacon transmitters, accomplished by providing the rotating antenna with an aluminum disc mounted on its drive shaft and mounting an iron slug on the periphery of the disc in line with the direction of the maximum lobe of the antenna cardioid pattern. A stationary pickup is mounted close to the periphery of the disc at due east of the center line of the antenna pattern. Therefore, at each rotation of the antenna, and as determined by the mounting of the stationary pickup coil, a signal is generated in the pickup coil to trigger the distance measuring transmitter into sending out the specially coded beacon reference E signals. This is described in the aforementioned article, "Principles of TACAN."

In the present system, one of the fifteen E reference pulses per second is distinguished in some manner at the beacon, such as by transmitting a different number of pulses than are normally transmitted. For example, instead of transmitting 12 pulse pairs spaced 30 microseconds apart, 24 pulse pairs can be transmitted spaced 15 microseconds apart. This special pulse is designated $\bar{E}$ in FIGURE 6A and may also be readily decoded and recognized at the aircraft receiver by conventional pulse decoding techniques. The production of the $\bar{E}$ pulse by the beacon is accomplished in a preferred form of the invention by providing an electronic counter for counting the E pulses and providing a trigger signal every 15 E pulses. The $\bar{E}$ may also be generated by providing a suitable mechanical arrangement, such as a reduction gear and counter mechanism on the beacon antenna drive shaft, or any other suitable electronic, mechanical or electromechanical arrangement.

FIGURE 6B is an expanded time scale on which a number of beacon reference pulses are shown between E and $\bar{E}$ pulses. The beacon reference pulses are transmitted 135 times per second in a conventional TACAN system and the E pulses are produced every $1/15$ seconds. In FIGURE 6B, the $\bar{E}$ pulse is shown as being produced at $t=0$ seconds and is produced every second thereafter. It should be recognized that any of the E pulses may be converted into the $\bar{E}$ pulse so long as the timing sequence between successive $\bar{E}$ pulses is maintained.

FIGURE 6C shows a still more expanded time scale divided up into intervals of $1/810$ seconds between adjacent beacon reference pulses. As described with respect to FIGURES 7–9, an aircraft interrogation pulse may be transmitted at any one of six sub-intervals (positions) spaced equally $1/810$ seconds apart, within each $1/135$ second interval between beacon reference pulses. The process of transmitting at one of the six instants between beacon reference pulses is commonly known as "jitter." According to the present invention, controlled "jitter" is used to transmit altitude information.

The six intervals between two beacon reference pulses are marked off in altitude layers which, for the purposes of explanation, are shown as being as ±150 feet in height in FIGURE 6C. For the purposes of altitude data transmission, the aircraft interrogation pulse transmitter is connected to and is controlled by an altitude sensing device in the aircraft, such as the aircraft's barometric altimeter. The altitude measured by the altitude sensing device is preferably converted into an electrical signal by well known equipment for example of the type employed in auto-pilot systems or by a shaft position (analog) to digital converter. The electrical signal produced is used to regulate the transmission of the interrogation pulses to the proper time.

To explain the particular type of altitude coding shown in FIGURE 6, when the aircraft transmitting the altitude data is flying at an altitude between 0–150 feet, it interrogates synchronously with the transmission of the $\bar{E}$ pulse, in accordance with the principles of operation of the system previously set forth. The interval from 0 to $1/135$ seconds after the $\bar{E}$ pulse is divided into five altitude positions spaced $1/810$ seconds apart corresponding to 150–450 feet, 450–750 feet, etc. The median altitude for each of these levels is shown in FIGURE 6C. When the interrogating aircraft is in one of these altitude layers it transmits its interrogation-pulse at the particular instant in the $1/135$ second period corresponding to its particular altitude.

The time interval from zero seconds (the transmission of the $\bar{E}$ reference pulse), to the next beacon pulse, at $1/135$ second, in the described example takes care of altitudes up to 1650 feet. From $1/135$ seconds after the occurrence of the $\bar{E}$ pulse to the next E pulse at $1/15$ seconds, the transmission of aircraft interrogation pulses is unrestricted and during this time, the aircraft transmitter is synchronized to the beacon reference pulses. At the occurrence of the next E pulse another altitude information transmission period is initiated and aircraft in the 1650–1950 feet range interrogate. In each of the five subsequent altitude layers, which in the example described increase by 300 feet increments and take care of altitudes up to 3350 feet, aircraft in these altitude layers interrogate at positions representative of this respective altitude. In general, each aircraft interrogates once every second expressly for the purpose of providing altitude information, and the remaining interrogation-pulses maintain transmitter synchronism with the beacon.

It can be realized that in one second there are fifteen altitude data transmission groups, corresponding to the fifteen 1/135 second periods after the fourteen E pulses and the single $\overline{\text{E}}$ pulse. Each group has six allowable positions reserved for altitude transmission so that a total of 90 altitude layers are covered. In the present example altitude data up to 27,000 feet could be transmitted. The system is not restricted to making the altitude interval represented by each position constant over all altitudes, nor for altitude data to be transmitted every second. For example, the altitude information transmission rate can be reduced to once every 2 seconds so that 180 altitude levels are distinguishable during the two-second period. It should also be realized that different layers other than the 300 foot layers described can be utilized in order to make the range of measurement coarser or finer. For example, for coarser measurements, the layers can be designated at 500 feet, or greater intervals and for finer measurement, the layers can be designated 100 feet, or less, intervals. Any suitable altitude designations or layers may be used as long as the coding system is made universal for all aircraft and ground stations.

The reason for distributing the altitude data transmission positions over fifteen 1/135 second groups during a one second interval, between the transmission of $\overline{\text{E}}$ pulses, rather than using one continuous time period is that it is desired to produce minimum interference with the routine search and track procedures of the aircraft's navigation system. It has been found that the excision of the fifteen time intervals of 1/135 second each second for use for altitude information transmission and in which no routine search and track transmissions take place is tolerable. It should be realized that the 1/135 second altitude data intervals can be shorter if necessary, and a longer time can be used to achieve the same information transmission rate. For example, 1/270 seconds altitude data intervals can be used after each E pulse, each interval having three altitude positions. Also, the number of positions in each altitude data interval can be doubled or tripled.

The superior qualities of this system of reserving certain time positions for interrogation by aircraft at particular altitudes should be readily recognized since it makes possible the determination of range, altitude and bearing (by interferometric measurements) of an aircraft by a single pulse transmission. In accordance with the present invention, the single interrogation pulse transmitted by an aircraft at a particular altitude is received by other aircraft and range, bearing, and altitude information is derived therefrom. When the transmitting aircraft is in the track mode of operation, in which it transmits between 22.5–30 interrogation pulses per second, the pulses which are not restricted to a particular altitude position (all but one pulse per second in the example described) are used to maintain synchronism between the aircraft interrogation pulse generator and the beacon reference pulses. These unrestricted interrogation pulses may also be used for range and bearing measurement by other aircraft. The altitude of one aircraft is determined by another aircraft by noting the sub-interval corresponding to an altitude layer in which the single altitude coded interrogation pulse is received; while range between aircraft is determined by measuring the time interval starting from the initiation of the sub-interval during which each interrogation pulse is received. Where collision avoidance indication is desired, it is preferable to have the range and bearing measured by only with respect to altitude-coded pulses. In this manner, a three coordinate measurement, range, altitude and bearing is made from the single altitude coded pulse.

The above described manner of transmitting altitude information can be readily utilized by an aircraft to obtain altitude information concerning possible colliding aircraft. This can be accomplished by gating the collision avoidance or pilot warning receiver open only at the times corresponding to an aircraft's own altitude and perhaps adjacent altitude layers. It should be realized that an aircraft is not concerned, from the collision point of view, with other aircraft flying at a greatly different altitude. The gating pulses for holding the receiver open are the same or similar control signals from the aircraft's altitude measuring device which are used to trigger off the interrogation transmitter at the specific time for altitude data transmission. This is described in detail below.

The altitude information transmitted by aircraft in the above-described manner can also be readily utilized by ground-based air traffic control centers. This can be accomplished by gating open the range-bearing receivers on the ground at specific intervals to separate air traffic into separate altitude layers. The range and bearing of each aircraft in a layer may then be determined to give the precise position (range, altitude and bearing) of each aircraft in the vicinity of the air traffic control center.

FIGURE 10 is a block diagram of a system for transmission of the altitude coded pulses, and also of a system for receiving altitude coded pulses from other aircraft from which altitude, range and bearing measurements can be made, in accordance with the principles of operation of the invention. The same reference numerals have been utilized in FIGURE 10 to correspond with those elements of the other figures which performs the same functions. In FIGURE 10, an 810 pulses-per-second clock pulse generator 60 is controlled by a frequency and phase lock servo system similar to the one described in FIGURES 4 and 5. The clock pulse generator 60 may be a multi-vibrator designed to operate at 810 p.p.s. and whose frequency and phase are precisely controlled by the servo system. A receiver 44 is provided to pick up the information transmitted by the beacon, which includes reference, reply, E and $\overline{\text{E}}$ pulses.

All of the information picked up by the receiver 44 is channeled into a reference pulse decoder 46 and a reply pulse decoder 47 which reproduce at their respective outputs only the beacon reference and reply pulses. The output of the reference pulse decoder 46 is connected to the input of the reference range memory circuit 48 and the output of the reply pulse decoder 47 is connected to the input of the reply range memory circuit 49. As has been previously described, reference and reply range memory circuits 48 and 49 respectively, produce voltages $E_{REF}$ and $E_{RPY}$. These voltages, as has been previously described, are respectively representative of $2T_{REF}$ and $T_{RPY}$.

In order to initiate the production of the $E_{REF}$ voltage, the input of the reference range memory circuit 48 is supplied with clock pulses from clock pulse generator 60. The production of $E_{REF}$ is described with respect to FIGURES 7–9. In order to produce the $E_{RPY}$ voltage, the input of the reply range memory circuit 49 is connected to the output of the interrogation pulse generator 32 via the line 65 and through a switch 86. The production of the $E_{RPY}$ voltage is also described with respect to FIGURES 7–9.

The output voltages of the memory circuits 48 and 49 are applied to the input of the difference circuit 50 which performs the operation $E_{REF} - E_{RPY}$. The difference circuit 50 produces an output voltage which is either positive, negative or zero depending on the relationship of the aircraft interrogation pulses to the beacon reference pulses, as described with respect to FIGURES 7–9. This error voltage is supplied to the input of a frequency and phase lock servo control circuit 40, one type of which is described in detail with respect to FIGURES 4 and 5, to control the frequency and phase of the clock pulse generator 60. Other suitable types of servo-lock circuits are also well known in the art and may be used if desired.

An $\overline{\text{E}}$ pulse decoder 67 is connected to the output of the receiver 44 to detect the reception of $\bar{\text{E}}$ pulses. As previously explained, each $\bar{\text{E}}$ pulse is coded differently from the other beacon transmissions and therefore may be readily identified. The output of the $\bar{\text{E}}$ pulse decoder 67 is utilized as a start pulse for a counter 69 which is preferably of the binary type. The counter 69 is also supplied with clock pulses from the clock pulse generator 60. The counter 69 is reset to zero on receiving an $\bar{\text{E}}$ pulse and it counts successive clock pulses from the generator 60 until 810 clock pulses have been counted, at which time another $\bar{\text{E}}$ pulse is received from the decoder 67 to reset the counter to zero and start its counting cycle over.

The aircraft is provided with an altimeter 70, which is preferably of the barometric type. The altimeter 70 has an output shaft 72 which is connected to the input of a shaft position-to-digital converter 75. The altimeter 70 measures the aircraft's altitude above a reference level and the altitude is then represented by the position of the altimeter shaft 72. The shaft position is in turn changed into code, which is preferably of binary form, by the converter 75. The output code of the converter 75 is set to produce numbers which are representative of altitude data transmission positions, as is described below.

The binary number outputs of the converter 75 and the counter 69 are applied to a comparator 77 which compares the two binary numbers. The comparator 77 may be any suitable type, for example, that made by Navigation Computer Corp. Model No. 120A. The output code of converter 75 is set so that the reading on the counter 69 and the code at its output of the converter 75 are identical at the time of the altitude data transmission position immediately preceding that which is used by an aircraft at a given altitude, to transmit that altitude. For example, if the aircraft is flying at 2100 feet it would transmit an interrogation pulse on the 37th position, following the $\bar{\text{E}}$ pulse. Therefore, interrogation pulse transmission should occur when the number output of the counter is 37. The converter 75 is coded to produce a number for the same altitude of 2100 feet which is one less than the number 37; in this example, the converter produces the number 36 for an altitude of 2100 feet. Stated another way, when the aircraft is at an altitude of 2100 feet the converter 75 has at its output the digital number 36. At the 36th pulse out of the clock generator 60 after the $\bar{\text{E}}$ pulse, which corresponds to an altitude transmission position of 1800 feet, the output of the counter 69 is also the digital number 36. Therefore, coincidence occurs in the comparator 77 and it produces an output at the transmission position (the 36th) immediately preceding that which is used by the aircraft to transmit the altitude coded interrogation pulse representing an altitude of 2100 feet (the 37th position).

It should be realized that the output of the converter 75 is coded to correspond to the altitude data transmission sequence. For example, in the system being described, the converter produces the number 36 for an altitude of 2100 feet. It would therefore produce the number 37 for 2400 feet; 38 for 2700 feet; 39 for 3000 feet; etc. For 600 feet the number 1 is produced; the number 2 for 900 feet; 3 for 1200 feet; 4 for 1500 feet; 35 for 1800 feet; etc.

Upon coincidence, the output of the comparator 77 triggers a single-shot multivibrator 79 which conditions an AND gate 81 to allow the next clock pulse to pass through to an OR gate 83. The multivibrator 79 keeps AND gate 81 open the necessary $\frac{1}{810}$ second to pass the next clock pulse and then closes it. In the example being described, the next clock pulse is the 37th clock pulse, representative of the altitude position of 2100 feet. The output pulse from OR gate 83 passes through a track-search switch 85, when in the track position, to the interrogation pulse generator 32. The clock pulse passing through OR gate 83 triggers off the generator 32 so that the interrogation pulse is produced and transmitted via the transmitter 36.

In this manner, in the example described, the 37th position out of the 810 positions in a one-second interval is utilized to transmit the single pulse, corresponding to the arcraft's altitude of 2100 feet. In a similar manner, interrogation pulses are transmitted at any of the altitude data positions in accordance with the altitude of the aircraft as determined by the altimeter 70. This single transmitted interrogation pulse is received by other aircraft in the vicinity and suitable measurements are made of it to determine the range and bearing of the transmitting aircraft. The time of transmission and reception of the pulse is representative of the transmitting aircraft's altitude. It should be realized that the $\frac{1}{810}$ second interval between each successive pair of altitude data positions allows reception for aircraft up to 230 miles away.

In order to maintain the clock pulse generator 60 in synchronism with the beacon reference pulses, other interrogation pulses transmitted by the aircraft during the track mode of operation are utilized in the manner previously described. The interrogation pulses which are unrestricted to altitude positions are "jittered" to occur at various $\frac{1}{810}$ second sub-intervals to synchronize the clock pulse generator 60, as described with respect to FIGURES 7–9. It should be undersood, however, that each $\frac{1}{135}$ second interval after the reception of an E or $\bar{\text{E}}$ pulse is reserved for the transmission of altitude data. The "jitter" of the interrogation pulses and the restriction of their transmission to certain periods is accomplished in the following manner by the random pulse gate generator 87 and the AND gate 89.

The construction and operational waveforms of the random pulse gate generator 87 are shown in FIGURES 11 and 12. It should be realized that the random pulse gate generator to be described may also be utilized with the pulse transmission sequence described with respect to FIGURES 7–9 and also with the pulse transmission system referred to previously wherein only 135 transmission positions are utilized.

Referring first to FIGURE 11, the random pulse gate generator 87 has a noise generator 90 which may be of the conventional gas-tube which is commercially available, for example, that shown in Catalog P of General Radio Company, at page 126. The output of the noise generator 90 is shown in FIGURE 12, line A. The output of the noise generator 90 is applied to the input of a limiter circuit 92, which may be a suitable vacuum tube, transistor, or diode circuit, to limit the noise generator output to a constant amplitude. The output signal from the limiter 92 is then applied to the input of a band pass filter 94 whose bandwidth determines the number of independent values of noise impulses per second at the output of the filter. The number of independent values roughly equals the bandwidth of the filter. This output is shown in FIGURE 12, line B.

The noise signal output from the filter 94 is used to trigger a monostable blocking oscillator 96 which is normally biased to cutoff. The blocking oscillator 96 has an adjustable triggering bias level which is set so that the oscillator will respond to noise impulses of sufficient amplitude to produce the desired average rate of interrogation pulses; i.e., 22.5–30 in the track mode of operation and approximately 150 in the search mode of operation. The triggering bias level is shown by the dotted line 95 in FIGURE 12, line B. The triggering level is made adjustable in the blocking oscillator 96 by any suitable means which are well known in the art.

When the blocking oscillator 96 is triggered by a noise impulse of sufficient amplitude, an exponential voltage appears on its control grid. This is shown on line C of FIGURE 12. The exponential voltage waveform prevents triggering of the oscillator for its duration. The duration of the exponential can be set by selecting the RC time constant of the grid circuit. The duration of the exponential is set to be slightly longer than the time between occurrence of two clock pulses, or $\frac{1}{810}$ second in the example described.

The output from the monostable blocking oscillator 96 is an inverted reproduction of the exponential wave appearing on the grid. The output wave starts to be produced at the time the triggering level is exceeded by a noise pulse. The output of the oscillator is applied to the input of an interrogation pulse gate generator 98. The pulse gate generator, may be any suitable circuit, for example, a single-shot multivibrator, produces an interrogation pulse gate, which is shown on FIGURE 12, line D. The pulse gate generator starts to produce the gate at the beginning of the exponential and terminates the gate at a time when the exponential has decayed below a certain level. The pulse gate generator is set to produce a gate appropriately $\frac{1}{810}$ second long, in the system being described. Referring again to FIGURE 10, when the system is in track mode of operation, the pulse gate from generator 87, which is 22.5–30 cycles per second, is applied to one input of a three input AND gate 89. AND gate 89 receives as its other two inputs the clock pulses from the generator 60 and a second gating pulse from a multivibrator 100. The multivibrator 100 has two inputs, the first being from the beacon reference pulse decoder 46 and the other being from an E and $\overline{\mathrm{E}}$ pulse decoder 102. Decoder 102 recognizes and identifies the E and $\overline{\mathrm{E}}$ pulses, which had previously been selectively coded at the beacon, and applies an output pulse signal representative thereof to one of the inputs of the multivibrator 100. On receipt of an output from decoder 102, which signifies reception of an E or $\overline{\mathrm{E}}$ pulse, multivibrator 100 is turned "off" and produces an output for six altitude data transmission periods to block AND gate 89. In this manner the gating pulses from the random generator 87 are rendered ineffective and the altitude data transmission periods after each E and $\overline{\mathrm{E}}$ pulse are reserved for the selective transmission of the single interrogation pulse which was developed from the altimeter 70, comparator 77 and AND gate 81, in the manner previously described.

Upon receipt of the next beacon reference pulse after an E or $\overline{\mathrm{E}}$ pulse multivibrator 100 is turned "on" and AND gate 89 is conditioned. Upon simultaneous occurrence of a gating pulse from the random generator 87 and a conditioning gate from the multivibrator 100, AND gate 89 passes a clock pulse to the OR gate 83. The clock pulse then goes to the interrogation pulse generator 32 and an interrogation pulse is produced. This is shown in FIGURE 12, lines D, E and F. It should be noted that each gating pulse from the random generator 87 allows only one clock pulse to pass through AND gate 89. Further, AND gate 89 is conditioned to pass clock pulses which trigger the generation of interrogation pulses only from the first reference pulse after an E or $\overline{\mathrm{E}}$ pulse to the occurrence of the next E or $\overline{\mathrm{E}}$ pulse. With the system in the track mode of operation, the interrogation pulses which are not restricted to the altitude data transmission positions are utilized to synchronize the clock generator 60 with the beacon reference pulses or submultiples thereof, in the manner described with respect to FIGURES 7–9. It should be realized that the altitude coded pulse is also used for synchronizing purposes.

When the system is placed in the search mode of operation, the switch 85 is turned to search position. This connects the input of the interrogation pulse generator 32 to the output of an AND gate 105. When the system is in the search mode of operation, the triggering level of the random pulse gate generator 87 is set so that the average number of gates produced per second is approximately 150. This is accomplished merely by lowering the bias level of the blocking oscillator 96 as shown schematically at 95 so that approximately 150 of the noise pulses per second are of sufficient amplitude to trigger the blocking oscillator. The 150 gating pulses per second from the random generator 87 are brought out over a separate line to one of the inputs of AND gate 105. Clock pulses are applied to the other input of AND gate 105. Therefore, AND gate 105 is conditioned to pass approximately 150 clock pulses to the interrogation pulse generator 32, so that 150 interrogation pulses are transmitted to interrogate a beacon when the aircraft's TACAN system is in the search mode of operation.

When switch 85 is turned to the search position a ganged switch 86 disconnects the interrogation pulse feedback line 65 from the reply range memory circuit 49. The clock generator 60 is therefore no longer synchronized with the received beacon reference pulses. In the search mode of operation, synchronism is deliberately avoided in order that other aircraft can determine that an aircraft in the search mode is not locked onto the navigation system. This means that, due to its clock pulse generator 60 being unsynchronized, a searching aircraft is not permitted to transmit interrogation pulses at such a rate that its range and altitude appear stationary to other aircraft. Thus, aircraft in the search mode produce occasional random pulses on the display of aircraft in the tracking mode. These random pulses are readily distinguishable from interrogation pulses from aircraft which are operating in the track mode and transmitting altitude, range and bearing information on the single altitude-coded pulse. Pulses from the latter type of aircraft will be received regularly every second and will appear relatively stationary on the measuring equipment of another aircraft.

Each aircraft receiving the single pulse transmitted at the restricted altitude data transmission intervals can use it to measure range, bearing and altitude of the transmitting aircraft. Usually, each aircraft flying a level course is interested only in aircraft flying near its own altitude, or in the same altitude layer, since these would be the only aircraft with which it might possibly collide. Therefore, the coordinate measuring system of the receiving aircraft need be operative only to receive interrogation pulse transmissions from other aircraft which are at the same altitude layer. When these selective transmissions are received, the appropriate measurements are made on them to determine the range and bearing of the aircraft at that altitude layer. A system capable of accomplishing this is also shown in FIGURE 10.

In FIGURE 10, when the comparator 77 produces an output it also triggers a second single-shot multivibrator 119 which conditions and AND gate 112 for a period of $\frac{1}{810}$ second, to let the next clock pulse pass through to a sweep generator 114. This clock pulse is used to operate the range and bearing measuring circuit. This is similar to the operation performed in conditioning AND gate 81 to let the next clock pulse through for transmission as the interrogation pulse representative of the aircraft's altitude. It should be realized that the measuring circuits are operated only during the interrogation-pulse transmission period which is representative of the aircraft's altitude. Therefore, only the range and bearing of air craft at the same altitude will be measured.

An interrogation pulse receiver 116 receives all of the interrogation-pulses transmitted from aircraft which are in its range of reception. As explained before, all of the other transmitting aircraft locked onto the beacon are also synchronized to the respective beacon station and range information may therefore be derived from their interrogation-pulse. The clock pulse which passes through AND gate 112 triggers the sweep generator 114 to produce a sweep of a duration equal to the time between two successive clock pulses, in the example described this being $\frac{1}{810}$ second. The sweep generator 114 controls a display device 118, which is preferably a cathode ray tube operating with a plan position indicator (PPI) display. The cathode ray tube preferably has a relatively long persistence, or else a storage type tube is used.

The interrogation pulses which are picked up by receiver 116 are passed through the range circuit 119 and are displayed on the indicator 118, during the period of the trigger sweep, as an indication occurring at a distance from the origin point of the display indicating the range of the interrogating aircraft from the receiving aircraft. The range of the aircraft transmitting the interrogation-pulse will be accurate since the initiation of the range measuring interval (the start of the sweep) and the transmission of the interrogation-pulse, are synchronized. The interferometer 120 measures the bearing of the pulse received during this period and also preferably displays it on the same display device 118 so that a combined range and bearing measurement is presented. This is accomplished in a PPI display by using the output of the interferometer to control the angular position of the display of the signal representing the aircraft. The time of arrival of the signal from the transmitting aircraft controls the radial distance of the displayed signal from the origin of the sweep. In this manner, both the bearing and range of the aircraft transmitting the pulse are displayed. If desired, both the range and the bearing information may be displayed on digital readouts, as is well known in the art. It should be realized that the altitude of other aircraft is inherent in this measurement since the display device 118 is gated open only during the time representative of the altitude layer in which the receiving aircraft is flying. In order to determine the altitude it is only necessary to look at the altimeter 70.

Where it is desired to indicate the range and bearing of aircraft without regard to their altitudes, the sweep generator 114 will be triggered by every clock pulse instead of merely those corresponding to a particular altitude layer or layers.

It should also be realized that for pilot warning and collision avoidance uses that only the aircraft within a limited range from the measuring aircraft are of interest. Therefore, the sweep on the display indicator can be expanded to indicate only those aircraft within the range of interest, for example, 25 miles. Signals from aircraft beyond this range would be disregarded by the measuring aircraft, insofar as making measurements of the range and bearing of the transmitting aircraft. For air traffic control uses, the ground station may also be interested only in a limited range or in the complete 230 mile range. In either case, the sweeps of the aircraft and the ground station display device may be adjusted, as desired.

In many cases it might also be desirable to operate the range and bearing measuring circuits of an aircraft so that different altitude layers than the one in which the aircraft is flying, are investigated. For example, suppose the aircraft in question wanted to change its flight plan to climb or descend another altitude layer. This aircraft would therefore want to investigate the adjacent altitude layers to see whether any aircraft were present which were at a range and bearing which might present a collision hazard. This may be accomplished in the present system as follows:

The output of the comparator 77 can again be used to trigger the display 118 through the single-shot multivibrator 110 and AND gate 112 on a clock pulse corresponding to the present altitude of the aircraft, in the manner previously described, in order to investigate the layer in which the aircraft is flying. The triggering of the display 118 to give information of aircraft at the next higher and next lower altitude layers or at the two next higher or the two next lower altitude layers may be accomplished in a number of ways. For example, in one arrangement a plurality of readouts similar to the converter 75 are provided. Each readout is set to produce a coded output number representative of the interrogation-pulse transmission position immediately prior to the pulse position representative of an altitude layer which is to be investigated. The readouts are connected to the comparator 77 which has its other input connected to the output of the counter 69. The output code of the readouts are set to produce a comparison in the comparator 77 so that pulses trigger multivibrator 110 to enable clock pulses corresponding to a variety of different combinations of altitude layers to pass through AND gate 112 to trigger the display sweep. For example, the readout codes may be set to initiate a range and bearing measurement for the actual aircraft altitude layer, next higher and next lower altitude layers, for an aircraft planning to change its flight plan; actual aircraft altitude layer and the two next lower, or just the three next lower, altitude layers for an aircraft planning to descend; actual aircraft altitude layer and the two next higher, or just the three next higher, altitude layers for an aircraft planning to climb. The output of the comparator would then initiate a measurement on the display 118 so that the range and bearing of any aircraft in any of the desired altitude layers of interest may be determined. Again, the altitudes of aircraft measured in any layer is inherent in the measurement since we are able to tell at which altitude layer the measurement is being made by looking at the setting of the readout. Also, the readouts are adjustable so that any altitude layer or layers may be investigated.

It should be realized that as many altitude layers may be investigated as desired, with these layers being wholly above or below, or adjacent to the aircraft's actual altitude, it being necessary only to modify the output code of the readouts. For example, an aircraft flying at 20,000 may wish to investigate the altitude layers in the approach area around a particular airfield, to see whether it is suitable for landing. This can be accomplished by setting the codes of the readouts to cause the lower altitude layers to be investigated, even though the aircraft is flying at a higher altitude. The same arrangement may be used to investigate any desired altitude layer or layers.

Another advantage present in the system is that it may also be able to transmit data to other aircraft in the vicinity telling of its intended climb or descent. For example, if an aircraft is going to climb, it may investigate its own and the two next adjacent upper altitude layers. The pulse signifying the climbing aircraft's own altitude would be of the standard code in the manner previously described. AND gate 89 would be blocked and the readouts would cause interrogation-pulse to be transmitted for the next two upper altitude levels. The interrogation-pulses for these two layers would be of different codes thereby warning aircraft in those altitude layers, who are receiving interrogation transmissions in the layers of the planned ascent, of the impending climb of another aircraft into the altitude layer. Therefore, the system instead of being only passive to investigate other altitude layers, may also be made active to warn other aircraft in the layers of a planned climb or descent. The coding for the adjacent altitude layer pulses would be such so as to impart two kinds of information. First, whether the aircraft sending them out is planning to climb or descend and second, how many altitude layers away the potentially maneuvering aircraft is located. The coding may be accomplished by any of the well known techniques.

In the present system the measurement of range and bearing of aicarft which are false targets; i.e., not within a range which is of interest, is inherently minimized. This may be explained as follows. If aricraft are permitted to interrogate at instants separated by $\frac{1}{810}$ second, which corresponds to a one way propagation distance of 230 miles, it is possible that aircraft more distant than 230 miles, at 230+R miles, will appear to be closer than 230 miles. In general, an aircraft at 230+R miles can appear to be a false target at R miles if it interrogated at the allowed position $\frac{1}{810}$ second preceding the position at which a range-altitude measurement is made. Such a false target is referred to here as a ghost.

The reception of ghosts is limited by the increased attenuation suffered by these signals due to the longer path length, and by the intervention of the horizon which breaks the line of sight between transmitter and receiver. The first of these effects is of greater importance in measurement of relatively short ranges as in a collision avoidance application, and the second of these effects is of greater importance in air traffic control applications.

FIGURE 13 shows the quantities of interest in evaluating the elimination of ghosts by these effects. The curve 130 labeled $$\left(\frac{R}{R+230}\right)^2$$

shows the relative attenunation suffered by a ghost signal at $230+R$ miles as compared with a true signal at $R$ miles. The signal levels are in the ratio of the square of the two ranges due to spherical spreading of the energy. This curve 130 shows that out to 25 miles there is a difference of at least 20 db between the signal level to be expected from a true target and from a ghost. This is a substantial margin, and a receiver using sensitivity time control may effectively eliminate ghost signals on this basis. The short curve 131 at the bottom of FIGURE 13 labeled "$h_{min}$CAS" (collision avoidance system) indicates the minimum altitude at which a measuring aircraft and ghost aircraft at the same altitude are within line of sight of each other as a function of the indicated range of the ghost. Thus, with $R=10$ miles the ghost aircraft is 240 miles away ($230+10$) and must be at least at 7200 feet altitude to have line of sight communication. Since a good part of air traffic is above this altitude this effect can not be relied upon to eliminate ghosts. It is assumed here that aircraft interrogating at contiguous positions are at nearly the same altitude as suggested in the explanation of altitude coding. If this is not the case the effect of the horizon will be even less, as in those cases in which a high altitude aircraft interrogates a low altitude aircraft.

As the indicated range increases the ratio of the ghost signal strength to that of a true signal decreases as shown in FIGURE 13. For example, a ghost at 460 miles will appear to be at 230 miles with a signal level only 6 db less than a true target at 230 miles. However, an aircraft at 460 miles from ground ATC station must be at 106,000 feet to be line of sight so the signal strength differential between true targets and ghosts will exceed 6 db in practice. Referring to curve 130 of FIGURE 13, it is noted that the signal differential between ghost and true target drops to 20 db at an indicated range of 25 miles (ghost is actually at $230+25=255$ miles. The third curve 132 of FIG. 13 shows the altitude required of an interrogating ghost aircraft at indicated range R to have line of sight communications with a ground ATC station. At 255 miles the ghost aircraft must be at an altitude of 32,500 feet to have line of sight communication with a ground ATC station, as indicated by curve 132. Thus, if a minimum margin of 20 db is desired to discriminate against ghosts in ATC application, some other meausre must be used for aircraft at altitudes above about 30,000 feet. One way to do this is to separate allowable transmission positions corresponding to these very high altitudes to every other positon. If allowable transmission positons are $\%_{10}$ seconds, or 460 miles apart, a ghost 20 db weaker than a true target could appear at 50 miles (where the ghost was at $460+50=510$ miles). Such a ghost must be over 100,000 feet in altitude however, so the problem could be solved in this way.

The above measures can eliminate ghosts altogether if 20 db is an adequate margin for discrimination of true targets from ghosts. Another technique might be mentioned which will not reject ghosts but will identify them positively so that an observer or a computer can reject them. If, for example, the positions corresponding to altitude increase with time following one $\overline{E}$ pulse, and decrease with time following the subsequent $\overline{E}$ pulse, a ghost can only appear in alternate altitude transmission intervals and can be readily recognized visually or automatically.

It should also be realized that the single pulse transmission restricted to positions representative of aircraft altitude may be used to transmit a large quantity of data. The data handling capabilites of the system can be increased further as explained by the following example. Consider that the measurement of range and bearing of an aircarft can be accomplished by the datum contained in a single pulse, as described above. If the range and bearing accuracy is adequate, that single pulse will identify and can be assigned to a particular aircraft. When the aircraft is in the tracking mode, and is transmitting interrogation pulses at the normal TACAN rate of 22.5–30 per second, each interrogation pulse will be chosen from one of $^{810}\!\!\%_{30}=27$ pulse positions. If one interrogation pulse is used to transmit a datum by selection of one of the twenty-seven pulse positions which are each identified by their position with respect to the $\overline{E}$ and E reference pulses of the beacon, then one of twenty-seven possible data can be transmitted with each pulse. If two interrogation pulses are used for each datum, one of $27^2$ or 729 data can be transmitted with each pair. In practical use, actually $27 \times 21 = 567$ data may be more reasonably expected since $\frac{1}{135}$ seconds should be allowed between pulses for recovery of supply voltages.

When thirty interrogation pulses per second are transmitted by each aircraft in the track mode, each aircraft can transmit fifteen of such 567 level datums per second. The fifteen transmissions per second greatly exceeds any air traffic control requirements for content of information. This arrangement also means that the problem of interference between aircraft at the same range from the air traffic control center can be solved by using a number of pulse pairs for each datum and to use random selection by each aircraft of one pulse pair per second so that in two or three seconds all the data will be accumulated even though a number of aircraft are at the same range from the air traffic control center.

A system has therefore been described for the navigation of vehicle which is compatible with presently existing navigation systems, such as TACAN, and which also provides the added capabilities of pilot warning, collision avoidance and air traffic control. The system provides for the synchronization of all vehicle interrogation transmissions to the reference pulses transmitted by a fixed beacon. In accordance with the system a single interrogation-pulse carries range, bearing and altitude information and the navigation system is therefore not burdened with the transmission, reception, coding and decoding of extra pulses to transmit this information.

It should be realized that the particular diagrammatical circuit arrangements shown and described and the specific time values assigned to many of the pulse transmission sequences, have been so used in order to make the invention compatible with one type of presently existing navigation system. It should be realized that the principles of the present invention may be utilized with other types of navigation systems which use different pulse transmission and timing sequences. Therefore it will be understood that the preferred embodiment of the invention described above are illustrative only and that the invention is to be limited solely by the appended claims.

What is claimed is:

1. A system for transmitting signals representative of the altitude of a vehicle comprising, means for producing first signals at a predetermined rate and at predetermined times, said first signals providing a plurality of transmission positions in a fixed time interval, selected ones of said transmission positions being representative of various possible altitudes of the vehicle in accordance with a predetermined code, means for measuring the altitude of said vehicle, and means connected to said altitude-measuring means for selecting the transmission position representative of the measured altitude of said vehicle, and means responsive to said selecting means for transmitting an information signal which is representative of the altitude measured by the altitude measuring means.

2. In a navigation, collision avoidance, pilot warning and air traffic control system the combination comprising a plurality of first stations, each of said first stations having means for producing first signals, means for selecting certain of said first signals to represent positional information of the respective first station, and means for producing interrogation pulses in response to the selected first signals; and a second station having means for transmitting reference pulses at a fixed rate; the rate of production of said first signals being an integral multiple of the fixed rate of the reference pulses, each of said first stations also having means for synchronizing the production of said first signals to said reference pulses to have a predetermined time relationship therewith.

3. A system in a first station for use with a second station which transmits reference signals at a fixed rate and reply signals independent from said reference signals in response to interrogation signals from said first station; said first station comprising means for producing first signals at a rate which is a multiple of the fixed rate of said reference signals, means for transmitting interrogation signals in response to and coincident with selected ones of said first signals, and means responsive to said reference signals and said reply signals from said second station for synchronizing the production of said first signals to said reference signals.

4. A system in a first station for use with a second station wherein said second station has means for transmitting $n$ reference signals during an interval of time and means for coding the first and selected reference signals thereafter for transmission as a distinguishable E signal, where $n$ is an integer number; said first station having means for producing $nx$ first signals during said interval of time, where $x$ is an integer, means for measuring a positional coordinate of said first station with respect to a reference point, means for selecting data production times coincident with said first signals, the times selected being in response to said measured positional coordinate and representative of the positional coordinate of said first station with respect to a reference point in accordance with a predetermined code, and means for producing an information signal representative of the position of the first station with respect to said reference at the proper one of said selected times which is representative of the measured positional coordinate of said first station.

5. A system in a first station for use with a second station wherein said second station has means for transmitting $n$ reference signals during an interval of time and means for coding the first and selected reference signals thereafter for transmission as a distinguishable E signal; where $n$ is an integer number, said first station having means for producing $nx$ first signals during said interval of time, where $x$ is a integer, means for selecting data production times coincident with said first signals, the selected times being representative of the position of said first station with respect to a reference point in accordance with a predetermined code, means for producing an interrogation signal during one of said selected times coincident with a first signal which is representative of the position of said first station with respect to a reference point, said first station also having means for producing other interrogation signals coincident with other first signals which occur at non-selected times, said second station having means for transmitting reply signals in response to interrogation signals from said first station, and means at said first station responsive to the interrogation, reference and reply signals for synchronizing the production of said first signals to said reference signals.

6. A system in a first station for use with a second station which transmits reference signals at a fixed rate and reply signals in response to interrogation signals from said first station; said first station comprising means for producing first signals, means for transmitting interrogation signals in response to and in coincidence with selected ones of said first signals, first means for measuring the time interval between the production of a first signal and the reception of a reference signal and for producing a first output signal representative thereof, second means for measuring the time interval between transmission of an interrogation signal and the reception of the reply signal transmitted in response thereto, and for producing a second output signal representative thereof, means connected to said first and second means and to said means for producing the first signals and responsive to said first and second output signals for synchronizing the production of said first signals to said reference signals.

7. A system in a first station for use with a second station which transmits reference pulses at a fixed rate and reply pulses in response to interrogation pulses from said first station; said first station comprising means for producing clock signals at a rate which is an integral multiple of said fixed rate of said reference pulses, means for transmitting interrogation pulses in response to and coincident with selected ones of said clock signals, first means for measuring the time interval between the production of a clock signal and the reception of a reference pulse and for producing a first output signal representative thereof, second means for measuring the time interval between transmission of an interrogation pulse and reception of a reply pulse in response thereto and for producing a second output signal representative thereof, means connected to said first and second measuring means and to said clock signal producing means and responsive to said first and second output signals for synchronizing said clock signals to said reference pulses.

8. A system as set forth in claim 7 wherein said first measuring means and output signal producing means operates at twice the rate of said second measuring and output signals producing means.

9. A system for transmitting and receiving signals representative of the positions of a set of vehicles with respect to a reference, each of said vehicles having means for producing synchronized first signals at a predetermined rate and for thereby providing a plurality of transmission positions during an interval of time, selected ones of said transmission positions being representative of the altitude of said vehicle with respect to said reference in accordance with a predetermined code, said vehicle also having receiver means, and means for rendering said receiver means operative during the periods between said selected altitude-representative first signals to receive signals from othe vehicles which are transmitted at the transmission positions representative of the respective altitude of each said other vehicle.

10. A system for transmitting and receiving signals representative of the altitudes of a set of vehicles with respect to a reference, each of said vehicles having means for producing first signals at a predetermined rate and at predetermined times, said first signals providing a plurality of transmission positions during an interval of time, selected ones of said transmission positions being representative of the altitude of said vehicle above the reference in accordance with a predetermined code, means for measuring the altitude of said vehicle, means connected to said altitude-measuring means for selecting the proper first signal representative of said measured altitude, means for transmitting an information signal in response to said selected first signal, and means for receiving corresponding information signals from other vehicles.

11. A system as set forth in claim 10 wherein means are provided for synchronizing the production of said first signals in each of said vehicles to reference signals from a fixed station.

12. A system for transmitting and receiving signals representative of the altitudes of a set of vehicle with respect to a reference, each of said vehicles having means for producing first signals at a predetermined rate and at predetermined times, said first signals providing a plurality of transmission positions during an interval of time, selected ones of said transmission positions being representative of the altitude of said vehicle above the reference in accordance with a predetermined code, means for measuring the altitude of said vehicle, means connected to said altitude-measuring means for selecting the proper first signal representative of said measured altitude, means for transmitting an information signal in response to said selected first signal, and means for receiving corresponding information signals from other vehicles, said receiving means being activated in response to said selected first signal for the period between the selected first signal and the next successive first signal thereby rendering each vehicle operative to receive information signals only from vehicles at its own altitude.

13. A navigation, pilot warning and collision avoidance system for use with a plurality of vehicles, each of said vehicles having means for producing first signals at a predetermined rate and at predetermined times, said first signal providing a plurality of transmission positions during an interval of time, selected ones of said transmission positions being representative of the altitude of said vehicle above a reference in accordance with a pre-assigned code, means for synchronizing the production of said first signals to the production of first signals of other vehicles, means for measuring the altitude of said vehicle above said reference, means for producing a signal coincident with one of said altitude-representative first signals corresponding to the measured altitude, means for receiving corresponding transmitted signals from other vehicles only during the periods after the transmission position corresponding to its own altitude, and means responsive to the received signals for determining the range and bearing of said other vehicles with relation to the vehicle receiving the signals.

14. A system for transmitting and receiving signals representative of the altitudes of a number of vehicles with respect to a reference datum, each of said vehicles having: means for producing first signals at a predetermined rate and at predetermined times, said first signals providing a plurality of transmission positions during an interval of time and selected ones of said transmission positions being representative of the altitude of a vehicle above the reference datum in accordance with a predetermined code; means for measuring its respective altitude above said reference datum; means connected to said altitude measuring means for selecting the proper first signal representative of said measured altitude; and means for transmitting an information signal in response to said selected first signal.

15. A system for use with a plurality of vehicles, each of said vehicles having: means for producing first signals at a predetermined rate and at the same predetermined times, said first signals providing a plurality of transmission positions during an interval of time and selected ones of said transmission positions being representative of the position of a vehicle with respect to a reference datum; means for synchronizing the time of production of said first signals to the production of first signals of other vehicles; means for transmitting an information signal in response to a selected one of said position representative first signals corresponding to the measured position of the vehicle with respect to the reference datum; means for receiving transmitted information signals from other vehicles; and means responsive to the received information signals for determining the range of said other vehicles with respect to the vehicle receiving the information signals.

16. In a radio navigation system for a plurality of stations in which a first reference station transmits periodic reference signals to a number of second stations and each of said second stations may derive navigation data by transmitting interrogation signals to said first station and receiving reply signals therefrom, the improvement comprising at each second station:
  means responsive to said periodic reference signals for producing a plurality of first signals between two successive periodic reference signals and having a predetermined time relationship with respect thereto, said first signals having a pre-assigned code of positional data in accordance with the time of occurrence between said two successive periodic reference signals,
  and means for producing said interrogation signals in response to and at predetermined time relationships with selected ones of said first signals to indicate positional data of said second station.

17. In a radio navigation system for a plurality of stations in which a first reference station transmits periodic reference signals to a number of second stations and each of said second stations may derive navigation data by transmitting interrogation signals to said first station and receiving reply signals therefrom, the improvement comprising at each second station:
  a master timing means,
  means responsive to said periodic reference signals, interrogation signals and reply signals for synchronizing the master timing means to said reference signals, said master timing means establishing a plurality of timing positions between any two successive reference signals, each said timing position being representative of a predetermined positional datum,
  means for measuring the position of said second station with respect to said datum, and means responsive to the measured position for producing interrogation signals at predetermined time relationships with respect to said timing positions for indicating positional data of said second station.

18. In a radio navigation system for a plurality of stations in which a first reference station transmits periodic reference signals to a number of second stations and each of said second stations may derive navigation data by transmitting interrogation signals to said first station and receiving reply signals therefrom, the improvement comprising at each second station:
  a master timing means,
  means responsive to said periodic reference signals, interrogation signals and reply signals for synchronizing the master timing means to said reference signals, said master timing means establishing a plurality of timing positions between any two successive reference signals, each said timing position being representative of a predetermined positional datum,
  means for measuring the position of said second station with respect to said datum, means responsive to the measured position for producing interrogation signals at predetermined time relationships with respect to said timing positions for indicating positional data of said second station,
  and means for receiving the interrogation signals from other second stations for indicating their positional data with respect to said second station being described.

19. In a radio navigation system for a plurality of stations using interrogation, reference and reply signals the improvement comprising:
  a first station having means for transmitting periodic reference signals and a reply signal in response to a received interrogation signal,
  a second station for operating with said first station; said second station including:
    (a) means for receiving the periodic reference and the reply signals from the first station,
    (b) means responsive to the received periodic reference signals for establishing a number of timing positions between any two successive reference signals,
    (c) and means responsive to a condition of said second station for producing interrogation signals at predetermined time positions.

20. In a radio navigation system for a plurality of stations using interrogation, reference and reply signals the improvement comprising:
a first station having means for transmitting periodic reference signals and a reply signal in response to a received interrogation signal,
a second station for operating with said first station; said second station including:
(a) means for receiving the periodic reference signals and the reply signals from the first station,
(b) means responsive to the received periodic reference signals for establishing a number of timing positions between any two successive reference signals, each said timing position corresponding to a predetermined positional datum,
(c) means for producing an interrogation signal at a predetermined time relationship with respect to one of said timing positions during the interval between two successive reference signals to indicate positional data of the second station,
(d) and means responsive to the received reference and reply signals and the interrogation signals for synchronizing the establishment of the timing positions at a predetermined time relationship to said reference signals.

21. In a radio navigation system for a plurality of mobile stations which transmit interrogation signals and which operate with a reference station transmitting reference signals and reply signals independent of said reference signals in response to interrogation signals received from said mobile stations, the improvement at each mobile station comprising:
means responsive to a reference and a reply signal received from the reference station for establishing a number of interrogation signal transmission positions integrally multiply related to the reference signal and having a predetermined time relationship thereto,
means for measuring a positional coordinate of said mobile station with respect to a positional datum,
means responsive to the measured positional cordinate for producing an interrogation signal in response to and in a predetermined time relationship with a selected one of said interrogation signal transmission positions,
means for receiving interrogation signals from other mobile stations,
and means responsive to the received interrogation signals of the other mobile stations and the occurrence of the interrogation signal transmission positions for indicating the respective positional coordinates of said other mobile stations referenced to said positional datum.

22. A radio navigation system as set forth in claim 21 wherein said transmission positions have a pre-assigned code corresponding to various positional coordinates measured with respect to said positional datum.

23. In a radio navigation system for a plurality of mobile stations which transit interrogation signals and which operate with a reference station transmitting reference signals and reply signals independent of said reference signals in response to interrogation signals received from said mobile stations, the improvement at each mobile station comprising:
means responsive to a reference and a reply signal received from the reference station for establishing a number of interrogation signal transmission positions integrally multiply related to the reference signal and having a predetermined time relationship thereto,
means for measuring a positional coordinate of said mobile station with respect to a positional datum,
means responsive to the measured positional coordinate for producing an interrogation signal in response to and in a predetermined time relationship with a selected one of said interrogation signal transmission positions,
means for receiving interrogation signals from other mobile stations,
means responsive to the received interrogation signals of the other mobile stations and the occurrence of the interrogation signal transmission positions for indicating the respective positional cordinates of said other mobile stations referenced to said positional datum,
and means responsive to the measured positional coordinate of said mobile station for limiting the indicated positional coordinates of said other mobile stations to those having a predetermined relationship to the positional coordinate of the said mobile station.

24. A radio navigation system as set forth in claim 23 wherein said transmission positions have a pre-assigned code corresponding to various positional coordinates measured with respect to said positional datum.

25. In a radio navigation system for a plurality of mobile stations which transmit interrogation signals and which operate with a reference station transmitting reference signals and reply signals independent of said reference signals in response to interrogation signals received from said mobile stations, the improvement at each mobile station comprising:
means for measuring the altitude of said mobile station,
means responsive to a reference signal and a reply signal received from the reference station for establishing a number of interrogation signal transmission positions integrally multiply related to the reference signal and having a predetermined time relationship thereto, said transmission positions corresponding to various altitudes of said mobile station in accordance with a pre-assigned code,
means responsive to the measured altitude for producing an interrogation signal in response to the transmission position corresponding to the measured altitude,
means for receiving interrogation signals from other mobile stations,
and means responsive to the received interrogation signals of the other mobile stations and the occurrence of the interrogation signal transmission positions for indicating the respective altitudes of said other mobile stations.

26. A radio navigation system as set forth in claim 25 wherein means are provided for limiting the altitudes of other mobile stations to be indicated in accordance with the altitude of said mobile station.

27. A radio system at a station for producing information data signals corresponding to a positional coordinate of said station with respect to a coordinate reference datum comprising at said station:
means for measuring a coordinate location of said station with respect to said coordinate reference datum,
means for establishing at predetermined times during an interval of time information data signal production positions corresponding to pre-assigned coordinate locations with respect to said reference datum,
and means responsive to the measured coordinate location of said station with respect to said coordinate reference datum for producing an information data signal at the information data signal production position corresponding to the measured coordinate location of said station.

28. A radio system at a first station for producing information data signals corresponding to a positional coordinate of said first station with respect to a coordinate reference datum, said first station operating in conjunction with a second station which transmits periodic reference signals, comprising at said first station:

means for measuring a coordinate location of said first station with respect to said coordinate reference datum, mean for receiving the reference signals transmitted by said second station, means responsive to said received reference signals for establishing at predetermined times with respect to the transmission of reference signals by said second station information data signal production positions corresponding to pre-assigned coordinate locations with respect to said coordinate reference datum, and means responsive to the measured coordinate location of said first station with respect to said coordinate reference datum for producing an information data signal at the information data signal production position corresponding to the measured coordinate location of said first station.

29. A system in a first station for use with a second station which transmits reference signals at a fixed rate and reply signals independent from said reference signal in response to interrogation signals received from said first stations, said first station comprising:

means for producing first signals at a rate which is a multiple of the fixed rate of said reference signals, selected ones of said first signals representing positional data of said first station with respect to a reference point in accordance with a pre-assigned code, means for measuring a positional coordinate of said first station with respect to said reference point, means for producing an interrogation signal in response to said measured positional coordinate at a time of the occurrence of the first signal corresponding to the measured positional coordinate of said first station with respect to said reference point, and means responsive to the reference and reply signals from said second station for synchronizing the production of said first signals at said first station to have a predetermined time relationship with respect to said reference signals transmitted by said second station.

30. The method for use with a plurality of stations of transmitting information from each station corresponding to data pertaining to that station comprising the steps of:

producing a plurality of information transmission positions during a given interval of time which are each assigned a pre-arranged information datum, synchronizing in time the production of said information transmission positions at said stations, measuring the data to be transmitted by each station, and transmitting a signal at an information transmission position corresponding to the data measured.

31. The method for use with a plurality of first stations operating with a base station for transmitting from each first station information corresponding to data pertaining to that station comprising the steps of:

producing periodic reference signals at said base station during an interval of time, coding the first reference signal produced during each said interval as a distinguishable first reference signal, coding selected reference signals occurring during each said interval after said distinguishable first reference signal as a distinguishable second reference signal, producing at each first station a plurality of information transmission positions between the transmission of each said distinguishable first and second reference signals and the next successively occurring reference signal, each said transmission position being assigned a predetermined information datum, synchronizing in time the production of said information transmission positions, measuring the data to be transmitted by each station, and transmitting a signal at an information transmission position corresponding to the data measured.

32. In a radio navigation system for a plurality of mobile stations which transmit interrogation signals and which operate with a reference station which transmits reference signals which are received by the mobile stations, the improvement at each mobile station comprising:

means responsive to the reference signals received from the reference station for producing a plurality of interrogation signal transmission positions between two successive transmitted reference signals and having a predetermined time relationship thereto, means for measuring a positional coordinate of said mobile station with respect to a positional datum, and means responsive to the measured positional coordinate for producing the interrogation signal in response to and at a predetermined time relationship with respect to selected ones of said first signals.

33. A system for transmitting and receiving signals representative of data relating to individual stations of a set of stations comprising at each station:

means for measuring the data at said station, means for synchronously producing with the other stations a number of transmission positions at a predetermined rate and at predetermined times during an interval of time, selected transmission positions being representative of a predetermined data quantity in accordance with a predetermined code, and means responsive to the measured data of said station for producing a signal at the transmission position corresponding to the measured data quantity.

34. A system for transmitting and receiving signals representative of data relating to individual stations of a set of stations comprising at each station:

means for measuring the data at said station, means for synchronously producing with the other stations a number of transmission positions at a predetermined rate and at predetermined times during an intervals of time, selected transmission positions being representative of a predetermined data quantity in accordance with a predetermined code, means responsive to the measured data of said station for producing a signal at the transmission position corresponding to the measured data quantity, and means for receiving the signals produced by other stations.

References Cited by the Examiner

UNITED STATES PATENTS

| | | | |
|---|---|---|---|
| 2,554,893 | 5/1951 | Brunn | 343—112.4 |
| 2,612,601 | 9/1952 | Musselman | 343—103 |
| 2,869,121 | 1/1959 | Minneman et al. | 343—103 |
| 2,980,908 | 4/1961 | Vielle | 343—6.8 X |
| 3,025,521 | 3/1962 | Tatel et al. | 343—112.4 |

OTHER REFERENCES

Alexander et al.: Electrical Communication, vol. 34, No. 3, September 1957, pp. 160–178 incl.

Sullivan: Electrical Communication, vol. 34, No. 3, September 1957, pp. 198–208 incl.

CHESTER L. JUSTUS, *Primary Examiner.*

MAYNARD R. WILBUR, *Examiner.*

UNITED STATES PATENT OFFICE
CERTIFICATE OF CORRECTION

Patent No. 3,255,900                       June 14, 1966

Walton Graham

It is hereby certified that error appears in the above numbered patent requiring correction and that the said Letters Patent should read as corrected below.

Column 2, line 16, for "waring" read -- warning --; column 4, line 11, strike out "(at a station 2)", and insert the same in line 12, after "transmitter", same column 4; column 6, line 25, insert a closing parenthesis after the equation; line 60, for "terfrogation" read -- interrogation --; column 7, line 27, for "puulse" read -- pulse --; column 9, line 12, for "refreence" read -- reference --; line 66, for "in", second occurrence, read -- is --; column 10, line 13, for "$\psi$" read -- $\dot{\psi}$ --; column 10, equation "(10)" for that portion of the equation reading:

$$\frac{(1+V)}{C} \quad\quad\quad\quad \text{read} \quad\quad\quad\quad \frac{(1+V)}{C} - f\frac{V}{rC}$$

column 11, line 30, for "ssystem" read -- system --; column 13, line 22, before "devices" insert -- or radio bearing --; line 72, for "by" read -- be --; column 19, line 69, strike out "by"; column 23, line 43, for "Upun" read -- Upon --; column 27, line 61, for "positon" read -- position --; line 62, for "positons" read -- positions --; column 30, line 74, for "vehicle" read -- vehicles --.

Signed and sealed this 5th day of September 1967.

(SEAL)
Attest:

ERNEST W. SWIDER                      EDWARD J. BRENNER
Attesting Officer                   Commissioner of Patents